US011201367B2

(12) United States Patent
Yamaguchi et al.

(10) Patent No.: US 11,201,367 B2
(45) Date of Patent: Dec. 14, 2021

(54) FLAT BATTERY

(71) Applicant: Maxell Holdings, Ltd., Kyoto (JP)

(72) Inventors: Koji Yamaguchi, Ibaraki (JP);
Noriyuki Yabushita, Ibaraki (JP);
Toshikazu Yoshiba, Ibaraki (JP); Kenji Tsuda, Ibaraki (JP)

(73) Assignee: Maxell Holdings, Ltd., Kyoto (JP)

( * ) Notice: Subject to any disclaimer, the term of this patent is extended or adjusted under 35 U.S.C. 154(b) by 128 days.

(21) Appl. No.: 16/113,945

(22) Filed: Aug. 27, 2018

(65) Prior Publication Data
US 2018/0366689 A1 Dec. 20, 2018

Related U.S. Application Data

(62) Division of application No. 14/682,815, filed on Apr. 9, 2015, now abandoned, which is a division of
(Continued)

(30) Foreign Application Priority Data

| Sep. 18, 2008 | (JP) | 2008-239353 |
| Sep. 18, 2008 | (JP) | 2008-239354 |
| Sep. 19, 2008 | (JP) | 2008-241247 |

(51) Int. Cl.
*H01M 50/109* (2021.01)
*H01M 50/166* (2021.01)
(Continued)

(52) U.S. Cl.
CPC ....... *H01M 50/109* (2021.01); *H01M 50/153* (2021.01); *H01M 50/166* (2021.01);
(Continued)

(58) Field of Classification Search
CPC ..... H01M 2/0222–023; H01M 2/0413; H01M 2002/0297; Y10T 29/4911
See application file for complete search history.

(56) References Cited

U.S. PATENT DOCUMENTS

| 4,419,420 A | 12/1983 | Ishizaki |
| 5,952,121 A | 9/1999 | Blonsky et al. |

(Continued)

FOREIGN PATENT DOCUMENTS

| JP | 59224046 A | * 12/1984 | .......... H01M 2/0222 |
| JP | 4-341756 A | 11/1992 | |

(Continued)

OTHER PUBLICATIONS

Machine translation of JP-59224046-A (Year: 1984).*
(Continued)

*Primary Examiner* — Eugenia Wang
(74) *Attorney, Agent, or Firm* — Birch, Stewart, Kolasch & Birch, LLP

(57) ABSTRACT

A flat battery of the present invention is a flat battery including an exterior can and a sealing can with which an opening of the exterior can is sealed, wherein the exterior can and the sealing can include a bottom portion and a circumferential wall extending upright from an outer circumference of the bottom portion and have a cylindrical shape that is open at one end; a distal end portion of the circumferential wall of the exterior can is bent toward a central axis of the sealing can to form a curve, whereby the exterior can is fixed to the sealing can by crimping; in a cross-sectional shape of the sealing can in the direction of the central axis, the circumferential wall of the sealing can is a single layer wall without being folded back, and the circumferential wall of the sealing can includes a rectilinear portion that is connected to the bottom portion via a corner
(Continued)

portion; and an angle θ1 formed by the bottom portion and the rectilinear portion may be greater than 90°.

9 Claims, 30 Drawing Sheets

Related U.S. Application Data application No. 12/548,287, filed on Aug. 26, 2009, now abandoned.

(51) Int. Cl.
*H01M 50/171* (2021.01)
*H01M 50/167* (2021.01)
*H01M 50/153* (2021.01)
*H01M 50/131* (2021.01)

(52) U.S. Cl.
CPC ....... *H01M 50/167* (2021.01); *H01M 50/171* (2021.01); *H01M 50/131* (2021.01); *Y10T 29/4911* (2015.01)

(56) References Cited

U.S. PATENT DOCUMENTS

| 6,205,831 | B1 | 3/2001 | Adey et al. |
| 2004/0197643 | A1 | 10/2004 | Buckle |
| 2007/0111095 | A1 | 5/2007 | Padhi et al. |
| 2008/0166631 | A1 | 7/2008 | Takahashi et al. |
| 2008/0176144 | A1 | 7/2008 | Iwama et al. |
| 2014/0170472 | A1* | 6/2014 | Hattori ................ H01M 2/0222 429/174 |

FOREIGN PATENT DOCUMENTS

| JP | 7-57706 A | 3/1995 |
| JP | 10-255733 A | 9/1998 |
| JP | 11-312625 A | 11/1999 |
| JP | 2000-340189 A | 12/2000 |
| JP | 2002-298794 A | 10/2002 |
| JP | 2003-68254 A | 3/2003 |
| JP | 2003-123830 A | 4/2003 |
| JP | 3399801 B2 | 4/2003 |
| JP | 2003-151511 A | 5/2003 |
| JP | 2005-32507 A | 2/2005 |
| JP | 2005-310577 A | 11/2005 |
| JP | 2006-66308 A | 3/2006 |
| JP | 2007207534 A * | 8/2007 |
| WO | WO 02/13290 A1 | 2/2002 |

OTHER PUBLICATIONS

Machine translation of JP-2007207534-A (Year: 2007).*
Japanese Office Action dated Jan. 8, 2013, for JP Application No. 2008-239353.
Japanese Office Action dated Jan. 8, 2013, for JP Application No. 2008-239354.
Japanese Office Action dated Jan. 8, 2013, for JP Application No. 2008-241247.
Japanese Office Action for corresponding Application No. 2008-239354 dated Dec. 10, 2013.
Machine-generated translation of JP-07-057706-A, dated Mar. 3, 1995.
Machine-generated translation of JP-2003-068254-A, dated Mar. 7, 2003.
Panasonic, Manganese Dioxide Lithium Coin Batteries: individual Specifications [CR2032, CR2330], http://www.panasonic.com/industrial/includes/pdf/Panasonic_Lithium_CR2032_CR2330.pdf; 2005.

* cited by examiner

FLAT BATTERY

CROSS-REFERENCE TO RELATED APPLICATIONS

This application is a Divisional of application Ser. No. 14/682,815 (abandoned as of Dec. 26, 2018 (mailing date of the Notice of Abandonment)) filed on Apr. 9, 2015, which is a Divisional of application Ser. No. 12/548,287 (abandoned as of Aug. 13, 2015 (mailing date of the Notice of Abandonment)) filed on Aug. 26, 2009, which claims priority under 35 U.S.C. § 119(a) to Patent Application No. 2008-239353 filed in Japan on Sep. 18, 2008, Patent Application No. 2008-239354 filed in Japan on Sep. 18, 2008, and Patent Application No. 2008-241247 filed in Japan on Sep. 19, 2008, all of which are hereby expressly incorporated by reference into the present application.

BACKGROUND OF THE INVENTION

1. Field of the Invention

The present invention relates to a flat battery known as a coin-shaped battery or a button-shaped battery.

2. Description of Related Art

Flat batteries known as coin-shaped batteries or button-shaped batteries are used as a power supply, mainly for memory backup, in information devices, video equipment, and so on. FIG. 37 shows a perspective view of an example of a conventional flat battery. A flat battery 100 is constructed by combining an exterior can 101 serving as a positive electrode can and a sealing can 102 serving as a negative electrode can.

FIG. 38 is a cross-sectional view taken along0 line FF in FIG. 37. The flat battery 100 houses a power generating element 110 and is filled with a nonaqueous electrolyte. A gasket 103 is interposed between a circumferential wall 104 of the exterior can 101 and a folded-back portion 107 of a circumferential wall 105 of the sealing can 102. Sufficient strength of the portion of the sealing can 102 that is in close contact with the gasket 103 is ensured by the folded-back portion 107 formed in the sealing can 102.

A distal end portion 104a of the circumferential wall 104 of the exterior can 101 is bent toward a central axis 106 of the sealing can 102 to form a curve, whereby the exterior can 101 is fixed to the sealing can 102 by crimping. Thus, a gap between the exterior can 101 and the sealing can 102 is sealed with the gasket 103, and the exterior can 101 and the sealing can 102 having different polarities are insulated from each other.

For example, WO 02/013290 and JP 2003-151511A also disclose flat batteries that include a structure corresponding to the folded-back portion 107. A configuration in which the folded-back portion 107 is formed is advantageous in terms of the strength, but is disadvantageous in increasing the capacity.

Specifically, the external dimensions of the flat battery 100 are defined as predetermined dimensions. Assuming flat batteries have the same external dimensions, a corner portion 108 of the sealing can 102 in a configuration with the folded-back portion 107 is shifted toward the central axis 106 as compared with that in a configuration without the folded-back portion 107, which results in an accordingly reduced capacity.

On the other hand, JP 7-57706A, JP 2003-68254A, JP 4-341756A, and Japanese Patent No. 3399801 disclose configurations without the folded-back portion 107. These configurations are advantageous in increasing the capacity. However, a configuration without the folded-back portion 107 as proposed by JP 7-57706A, JP 2003-68254A, JP 4-341756A, and Japanese Patent No. 3399801, though advantageous in increasing the capacity, is disadvantageous in terms of the strength. Specifically, referring to FIG. 38, during a crimping process by which the distal end portion 104a of the circumferential wall 104 of the exterior can 101 is bent toward the central axis 106 to form a curve, the circumferential wall 105 of the sealing can 102 is also deformed toward the central axis 106. In other words, the circumferential wall 105 is deformed in a direction away from an inner circumferential face of the gasket 103. At this time, in a configuration without the folded-back portion 107, the adhesion between the circumferential wall 105 and the gasket 103 is reduced, which, in some cases, results in an insufficient seal with the gasket 103.

JP 7-57706A proposes a configuration for preventing an insufficient seal as described above, but does not go so far as to propose compensation for lack of strength. In addition, processing for changing the plate thickness of the circumferential wall is necessary.

SUMMARY OF THE INVENTION

The present invention has been conceived to address the conventional problems as described above, and it is an object thereof to provide a flat battery that is advantageous in increasing the capacity while ensuring the sealing properties.

In order to achieve this object, a flat battery according to a first aspect of the present invention is a flat battery including an exterior can and a sealing can with which an opening of the exterior can is sealed, wherein the exterior can and the sealing can include a bottom portion and a circumferential wall extending upright from an outer circumference of the bottom portion and have a cylindrical shape that is open at one end; a distal end portion of the circumferential wall of the exterior can is bent toward a central axis of the sealing can to form a curve, whereby the exterior can is fixed to the sealing can by crimping; in a cross-sectional shape of the sealing can in the direction of the central axis, the circumferential wall of the sealing can is a single layer wall without being folded back, and the circumferential wall of the sealing can includes a rectilinear portion that is connected to the bottom portion via a corner portion; and the rectilinear portion has a Vickers hardness greater than the Vickers hardness of the corner portion.

A flat battery according to a second aspect of the present invention is a flat battery including an exterior can and a sealing can with which an opening of the exterior can is sealed, wherein the exterior can and the sealing can include a bottom portion and a circumferential wall extending upright from an outer circumference of the bottom portion and have a cylindrical shape that is open at one end; a distal end portion of the circumferential wall of the exterior can is bent toward a central axis of the sealing can to form a curve, whereby the exterior can is fixed to the sealing can by crimping; in a cross-sectional shape of the sealing can in the direction of the central axis, the circumferential wall of the sealing can is a single layer wall without being folded back and is connected to the bottom portion via a corner portion; an upright portion, of the circumferential wall of the sealing can, sandwiched between the curved distal end portion of the circumferential wall of the exterior can and the bottom portion of the exterior can has a thickness greater than the thickness of the corner portion; and the upright portion has a Vickers hardness greater than the Vickers hardness of the corner portion.

A flat battery according to a third aspect of the present invention is a flat battery including an exterior can and a sealing can with which an opening of the exterior can is sealed, wherein the exterior can and the sealing can include a bottom portion and a circumferential wall extending upright from an outer circumference of the bottom portion and have a cylindrical shape that is open at one end; a gasket is interposed between an outer circumferential face of the circumferential wall of the sealing can and an inner circumferential face of the circumferential wall of the exterior can; a distal end portion of the circumferential wall of the exterior can is bent toward a central axis of the sealing can to form a curve, whereby the exterior can is fixed to the sealing can by crimping; and in a cross-sectional shape of the sealing can in the direction of the central axis, the circumferential wall of the sealing can is a single layer wall without being folded back, the bottom portion of the sealing can is a planar portion, the circumferential wall of the sealing can includes a rectilinear portion connected to the planar portion via a corner portion, and an angle θ1 formed by the planar portion and the rectilinear portion is greater than 90°.

BRIEF DESCRIPTION OF THE DRAWINGS

FIG. 9A is a cross-sectional view showing a state in which a gasket 4 is installed on a sealing can 3, and FIG. 9B is a cross-sectional view showing a state in which a power generating element 10 is housed in the sealing can 3.

FIG. 13A is a cross-sectional view of the comparative example, and FIG. 13B is a cross-sectional view of Embodiment 1 of the present invention.

FIG. 22A is a cross-sectional view showing a state in which a gasket 4 is installed on a sealing can 3, and FIG. 22B is a cross-sectional view showing a state in which a power generating element 10 is housed in the sealing can 3.

FIG. 26A is a cross-sectional view of the comparative example, and FIG. 26B is a cross-sectional view of Embodiment 2 of the present invention.

FIG. 31A is a cross-sectional view showing a state in which a gasket 4 is installed on the sealing can 3, and FIG. 31B is a cross-sectional view showing a state in which a power generating element 10 is housed in the sealing can 3.

FIG. 36A is a cross-sectional view of the comparative example, and FIG. 36B is a cross-sectional view of Embodiment 3 of the present invention.

DETAILED DESCRIPTION OF THE INVENTION

Figure 1:
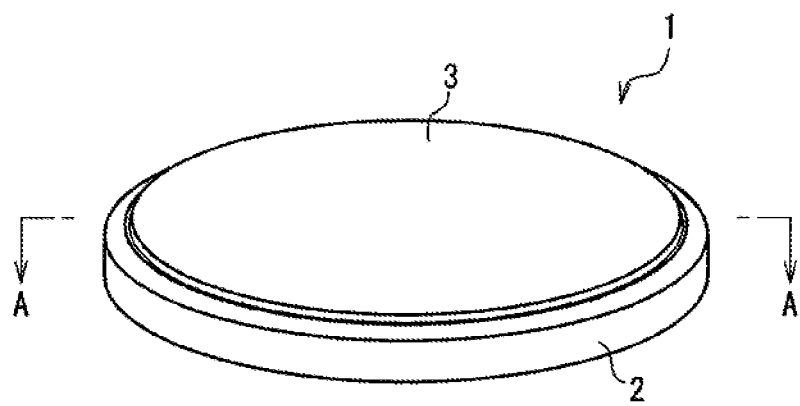
FIG. 1 is a perspective view of a flat battery according to Embodiment 1 of the present invention.

According to the flat battery of the first aspect of the present invention, in the sealing can, the Vickers hardness of the rectilinear portion is greater than the Vickers hardness of the corner portion. Therefore, deformation of both the corner portion and the rectilinear portion is suppressed during a crimping process, and the sealing properties provided by a gasket are thus maintained.

In the flat battery of the first aspect of the present invention, it is preferable that the Vickers hardness of the corner portion is 150 or more, and the Vickers hardness of the rectilinear portion is 200 or more.

Moreover, it is preferable that the Vickers hardness of the rectilinear portion is 1.05 times or more greater than the Vickers hardness of the corner portion.

Moreover, it is preferable that the rectilinear portion is work hardened by processing that causes the rectilinear portion to be compressed.

Moreover, it is preferable that the gasket is pressed against the circumferential wall of the sealing can so as to press the circumferential wall of the sealing can toward the central axis. This configuration provides good insulation properties and sealing properties between the exterior can and the sealing can having different polarities.

Moreover, it is preferable that the circumferential wall of the sealing can is stepped at a shoulder portion, the gasket is interposed between the shoulder portion and the circumferential wall of the exterior can, and the gasket is pressed in a height direction of the sealing can. This configuration also provides good insulation properties and sealing properties between the exterior can and the sealing can having different polarities.

According to the flat battery of the second aspect of the present invention, the upright portion having a greater thickness and hardness than the corner portion is formed in the circumferential wall of the sealing can. Therefore, deformation of the upright portion is suppressed during a crimping process, and the sealing properties provided by a gasket are thus maintained.

In the flat battery of the second aspect of the present invention, it is preferable that throughout the circumferential wall of the sealing can, the Vickers hardness is greater than the Vickers hardness of the corner portion. With this configuration, deformation of the entire circumferential wall of the sealing can is suppressed during the crimping process, which is more advantageous in preventing the sealing properties from decreasing.

Moreover, it is preferable that the Vickers hardness of the corner portion is 150 or more, and the Vickers hardness of the upright portion is 200 or more.

Moreover, it is preferable that the Vickers hardness of the upright portion is 1.05 times or more greater than the Vickers hardness of the corner portion.

Moreover, it is preferable that the upright portion is work hardened by processing that causes the circumferential wall of the sealing can to be compressed.

Moreover, it is preferable that the gasket is pressed against the circumferential wall of the sealing can so as to press the circumferential wall of the sealing can toward the central axis. This configuration provides good insulation properties and sealing properties between the exterior can and the sealing can having different polarities.

Moreover, it is preferable that the circumferential wall of the sealing can is stepped at a shoulder portion, the gasket is interposed between the shoulder portion and the circumferential wall of the exterior can, and the gasket is pressed in a height direction of the sealing can. This configuration also provides good insulation properties and sealing properties between the exterior can and the sealing can having different polarities.

According to the flat battery of the third aspect of the present invention, the angle $\theta 1$ formed by the planar portion and the rectilinear portion of the sealing can is greater than 90°. Therefore, the adhesion in an area of contact between the circumferential wall of the sealing can and the gasket is maintained, and the sealing properties provided by the gasket are thus maintained. Moreover, an effect of improving the sealing properties through spring-back of the circumferential wall of the sealing can and an effect of increasing the strength through work hardening in the vicinity of the corner portion of the sealing can also can be obtained.

In the flat battery of the third aspect of the present invention, it is preferable that the angle $\theta 1$ is 90.5° or more. With this configuration, it can be reliably ensured that the angle $\theta 1$ is greater than 90°.

Moreover, it is preferable that the angle $\theta 1$ is 95° or less. With this configuration, the amount of wasted space in the inner volume can be reduced.

Moreover, it is preferable that the gasket is pressed against the circumferential wall of the sealing can so as to press the circumferential wall of the sealing can toward the central axis. This configuration provides good insulation properties and sealing properties between the exterior can and the sealing can having different polarities.

Moreover, it is preferable that the circumferential wall of the sealing can is stepped at a shoulder portion, the gasket is interposed between the shoulder portion and the circumferential wall of the exterior can, and the gasket is pressed in a height direction of the sealing can. This configuration also provides good insulation properties and sealing properties between the exterior can and the sealing can having different polarities.

Moreover, it is preferable that an angle $\theta 2$ formed by the planar portion and the rectilinear portion at the time when the sealing can is in a separated state before assembly is 92° or more. With this configuration, it can be more reliably ensured that the angle $\theta 1$ at the time when the flat battery is in a completed state will be greater than 90°.

Moreover, it is preferable that when an angle formed by the planar portion and the rectilinear portion at the time when the sealing can is in a separated state before assembly is an angle θ2, an angle difference θ3 between the angle θ2 and the angle θ1 is between 0.5° and 5° inclusive. With this configuration, manufacturing is facilitated and, at the same time, the effect of improving the sealing properties through spring-back of the circumferential wall of the sealing can and the effect of increasing the strength through work hardening in the vicinity of the corner portion of the sealing can also can be obtained.

Hereinafter, embodiments of the present invention will be described in detail with reference to the drawings. Although Embodiments 2 and 3 partly overlap with Embodiment 1, the overlapping parts will be described again in Embodiments 2 and 3 for the convenience of description.

Embodiment 1

FIG. 1 shows a perspective view of a flat battery according to Embodiment 1 of the present invention. A flat battery 1 is constructed by combining an exterior can 2 serving as a positive electrode can and a sealing can 3 serving as a negative electrode can. An example of the flat battery 1 has an external diameter dimension (dimension D in FIG. 2) of 20.0 mm and a thickness of 5 mm.

Figure 2:
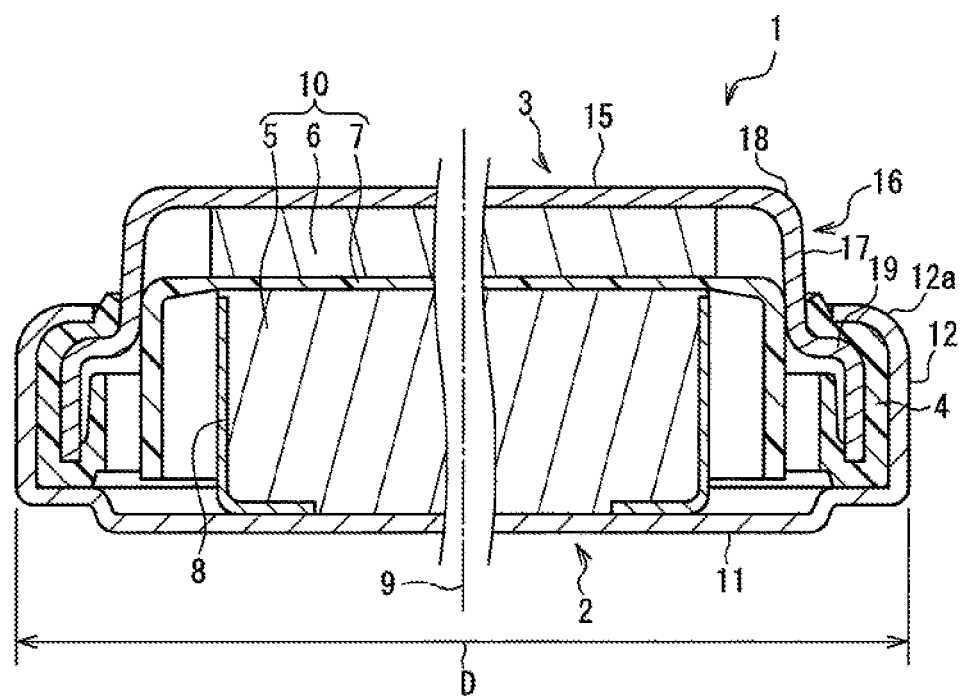
FIG. 2 is a cross-sectional view taken along line AA in FIG. 1.

FIG. 2 is a cross-sectional view taken along line AA in FIG. 1. The exterior can 2 includes a bottom portion 11 and a circumferential wall 12 extending upright from an outer circumference of the bottom portion 11 and has a cylindrical shape that is open at one end. The sealing can 3 includes a bottom portion 15 and a circumferential wall 16 extending upright from an outer circumference of the bottom portion 15 and has a cylindrical shape that is open at one end. A gasket 4 is interposed between an inner circumferential face of the circumferential wall 12 of the exterior can 2 and an outer circumferential face of the circumferential wall 16 of the sealing can 3.

A distal end portion 12a of the circumferential wall 12 of the exterior can 2 is bent toward a central axis 9 of the sealing can 3 to form a curve, whereby the exterior can 2 is fixed to the sealing can 3 by crimping. Thus, a gap between the exterior can 2 and the sealing can 3 is sealed with the gasket 4, and the exterior can 2 and the sealing can 3 having different polarities are insulated from each other.

The flat battery 1 houses a power generating element 10 and is filled with a nonaqueous electrolyte. The power generating element 10 includes a positive electrode material (electrode material) 5 made of a positive electrode active material and the like pressed into the shape of a disk, a negative electrode material (electrode material) 6 made of metallic lithium or an lithium alloy, which are negative electrode active materials, formed into the shape of a disk, and a non-woven fabric separator 7. The separator 7 is disposed between the positive electrode material 5 and the negative electrode material 6. A positive electrode ring 8 formed of stainless steel or the like is installed on an outer face of the positive electrode material 5.

Figure 3:
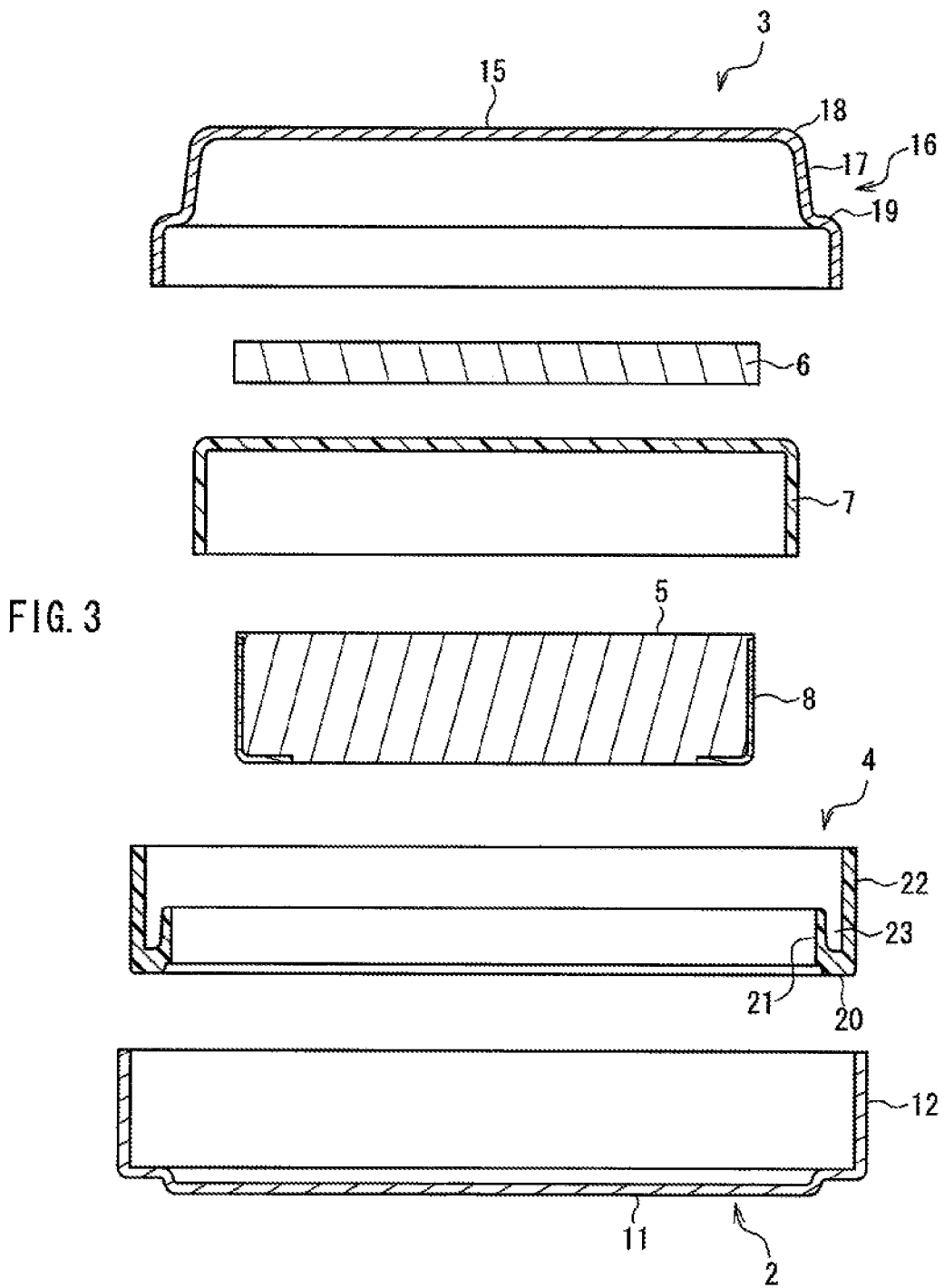
FIG. 3 is an exploded view of the flat battery 1 shown in FIG. 2.

FIG. 3 shows an exploded view of the flat battery 1 shown in FIG. 2. As described above, the exterior can 2 and the sealing can 3 have cylindrical shapes that are open at one end. These cans can be shaped by, for example, press forming a stainless steel material. The circumferential wall portion 16 of the sealing can 3 includes a rectilinear portion 17, and a corner portion 18 is formed at the intersection of the bottom portion 15 and the rectilinear portion 17. Furthermore, the circumferential wall portion 16 is stepped at a shoulder portion 19.

The gasket 4 is a resin molded article and is made by molding a resin composition containing, for example, polyphenylene sulfide (PPS) as a main ingredient and an olefin elastomer. The gasket 4 is a ring-like member and includes a base portion 20 and inner and outer walls 21 and 22 extending upwardly from the base portion 20. A gap 23 is formed between the inner wall 21 and the outer wall 22. The circumferential wall 16 of the sealing can 3 can be inserted into this gap 23.

The positive electrode material 5 is made by shaping the positive electrode active material integrally with the positive electrode ring 8 into the shape of a disk. Examples of the positive electrode active material include those obtained by shaping a positive electrode mixture prepared by mixing, for example, graphite, a tetrafluoroethylene-hexafluoropropylene copolymer, and hydroxypropylcellulose into manganese dioxide.

The separator 7 is formed of a non-woven fabric, and the material for the non-woven fabric is, for example, a fiber made of polybutylene terephthalate.

The separator 7 is impregnated with a nonaqueous electrolyte. For example, a solution of $LiClO_4$ dissolved in a solvent prepared by mixing propylene carbonite with 1,2-dimethoxyethane can be used as the nonaqueous electrolyte. The separator 7 has a thickness of, for example, about 0.3 to 0.4 mm.

The configuration of the flat battery 1 is schematically described above. However, the flat battery 1 according to Embodiment 1 is characterized by the distribution of hardness in the sealing can 3. Specifically, in the sealing can 3 shown in FIG. 3, the Vickers hardness of the rectilinear portion 17 is greater than the Vickers hardness of the corner portion 18. As will be described later in detail, the purpose of this is to suppress deformation of the rectilinear portion 17 of the sealing can 3 during a crimping process by which the distal end portion 12a of the circumferential wall 12 of the exterior can 2 is bent into a curve and thereby ensuring the sealing properties provided by the gasket 4.

Here, the Vickers hardness is a hardness that is measured in conformity with JIS Z 2244. In such a measurement, the surface of a test piece is indented using a diamond indenter having the shape of a quadrangular pyramid with an angle of 136° between opposite faces, and the surface area of the resulting permanent indentation is calculated from the diagonal length of the permanent indentation. The Vickers hardness is obtained from a value calculated by dividing the test load applied to the indenter when the indentation is made by the surface area of the permanent indentation.

Figure 4:
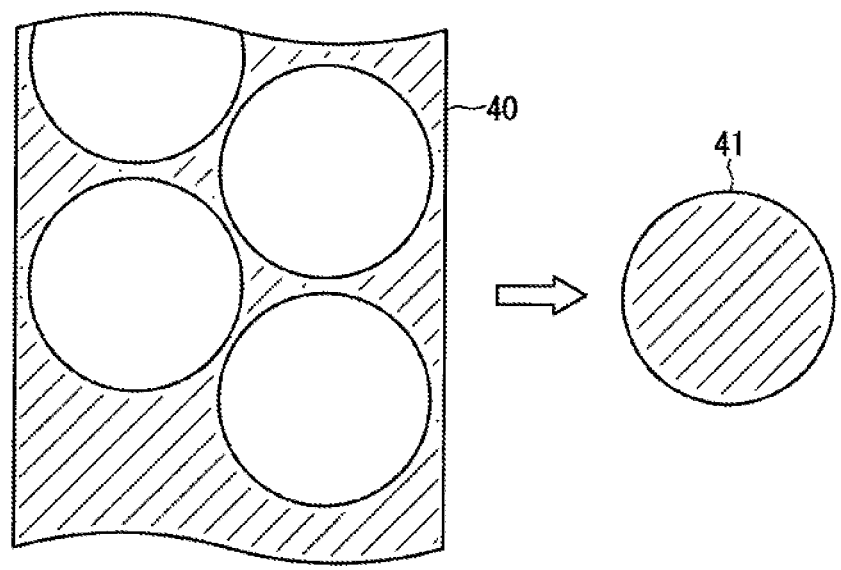
FIG. 4 is a diagram showing a state in which a disk-like member is blanked from a plate material according to Embodiment 1 of the present invention.

Hereinafter, a shaping method for achieving a distribution of hardness in the sealing can 3 as above will be described with reference to FIGS. 4 and 5A to 5E. FIG. 4 shows a state in which a disk-like member 41 is blanked from a plate material 40 that is the raw material for the sealing can 3. A transfer press is used to process the disk-like member 41. The transfer press is a press machine including dies corresponding to individual steps of multiple steps and a transfer mechanism that transfers a workpiece to the subsequent step. The disk-like member 41 is processed using the dies corresponding to the individual steps and formed into the shape shown in FIG. 3.

Figure 5A:
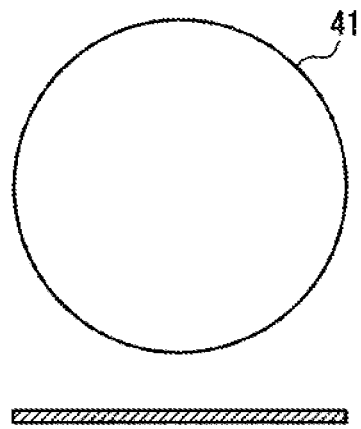
FIGS. 5A to 5E are diagrams showing the change in the shape of a workpiece after undergoing each step according to Embodiment 1 of the present invention.
Figure 5D:
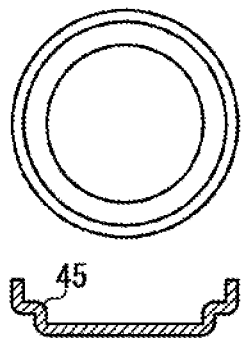
Figure 5B:
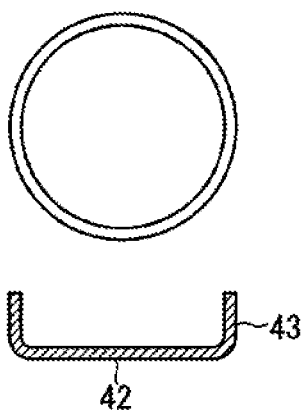

FIGS. 5A to 5E show the change in the shape of the workpiece after undergoing each step. Each of FIGS. 5A to 5E shows a plan view and a cross-sectional view. FIG. 5A shows the disk-like member 41. As described above, the disk-like member 41 is blanked from the plate material 40 as shown in FIG. 4. In FIG. 5B, the disk-like member 41 is drawn into a cylindrical shape that includes a bottom portion 42 and a circumferential wall 43 extending upright from an outer circumference of the bottom portion 42.

Figure 5E:
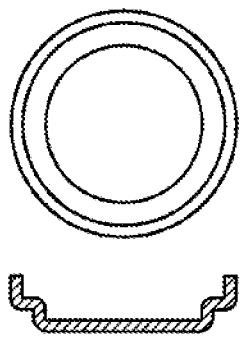
Figure 5C:
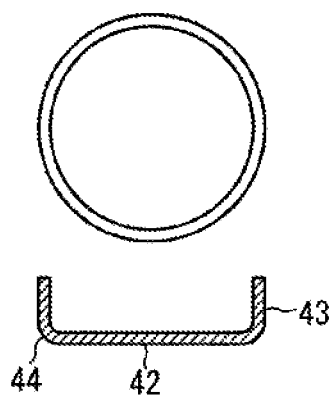

FIG. 5C shows a state of the workpiece after undergoing a beating step. In the state of FIG. 5C, the workpiece still has a cylindrical shape, but the height of the circumferential wall 43 is adjusted by beating the circumferential wall 43.

This height adjustment causes the circumferential wall 43 to be deformed under compression and work hardened. As described above, in the sealing can 3 according to Embodiment 1, the Vickers hardness of the rectilinear portion 17 is greater than the Vickers hardness of the corner portion 18. This is due to work hardening during the beating step. FIG. 5D shows a state in which a shoulder portion 45 is formed by processing a corner portion 44 of the workpiece shown in FIG. 5C. FIG. 5E shows a completed state after finishing.

The completed sealing can has the same shape as the sealing can 3 shown in FIG. 3. As described above, since the sealing can has undergone the beating step, the Vickers hardness of the rectilinear portion 17 is greater than the Vickers hardness of the corner portion 18.

On the other hand, the sealing can 3 shown in FIG. 3 also can be shaped by press working using a progressive die. However, a beating step cannot be included in this processing method, and so a sealing can 3 in which the Vickers hardness of the rectilinear portion 17 is greater than the Vickers hardness of the corner portion 18 cannot be obtained.

Figure 6:
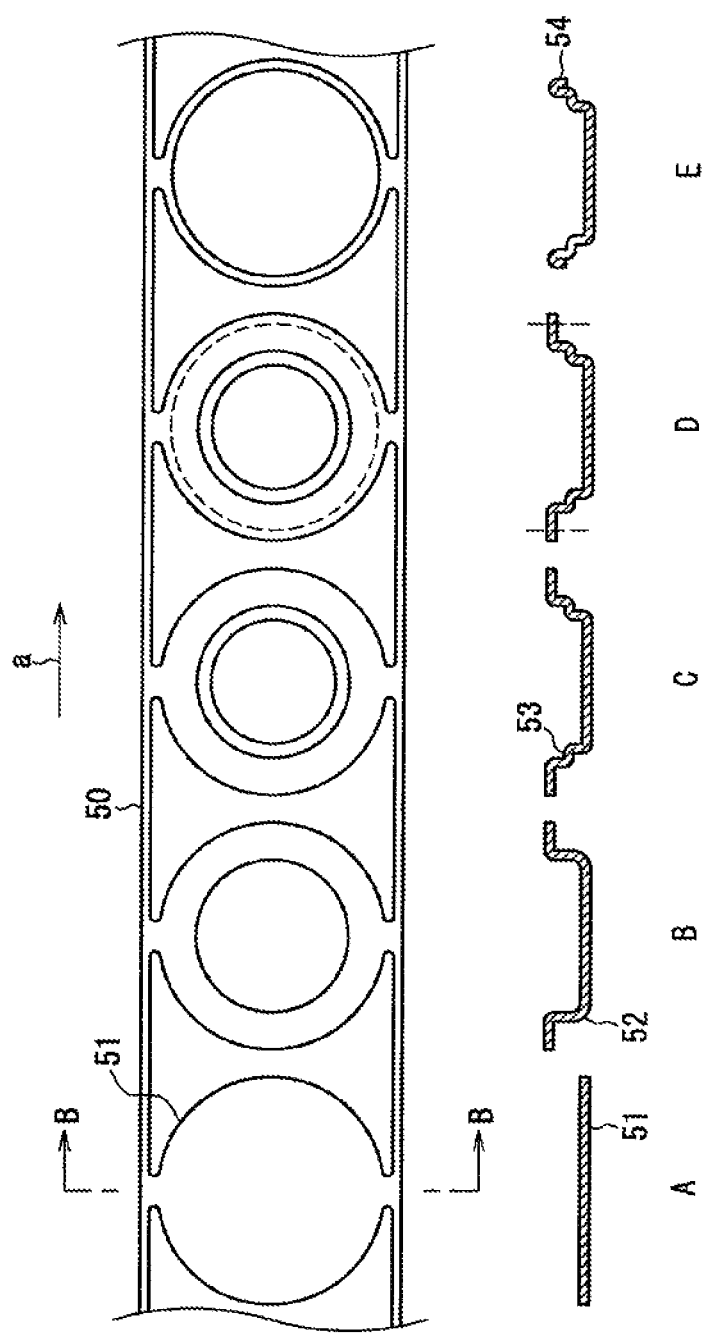
FIG. 6 is a diagram showing a method for shaping a sealing can according to a comparative example.

Hereinafter, a method for shaping a sealing can using a progressive die will be described as a comparative example. FIG. 6 shows a plan view of a coil material 50 that is being processed using a progressive die. FIG. 6 also shows cross-sectional views of workpieces. Each of the cross-sectional views is a cross-sectional view of the coil material 50 taken in a width direction (cross-sectional view taken along line BB), but the cross-sectional views are arranged laterally for the convenience of illustration.

In FIG. 6, each workpiece at A, B, or C is fed to the next station at a position B, C, or D by moving the coil material 50 forward by a distance corresponding to the interval between stations (in the direction of arrow a). In this state, the workpieces are processed into the shapes of the cross-sectional views at respective positions, in a single press stroke. That is to say, each time the coil material 50 is moved forward by a distance corresponding to the interval between stations, press operations at multiple stations are performed simultaneously.

A disk-like member 51 at A is processed into a drawn shape at B. A corner portion 52 of a workpiece having the drawn shape at B is processed so as to have the shape at C, in which a shoulder portion 53 is formed. At D, the workpiece processed into the shape at C is blanked along a dashed line and cut off from the coil material 50. An upper end portion 54 of the workpiece cut off from the coil material 50 is folded back as shown at E to form a shape corresponding to the folded-back portion 107 in FIG. 38. It is also possible to omit the operation at E and configure a circumferential wall as a single layer wall without a folded-back portion.

In the shaping method shown in FIG. 6, the workpiece remains integral with the coil material 50 while processing is proceeding. This shaping method is the same as the shaping method shown in FIGS. 5A to 5E in that the corner portion 52 can be work hardened by a bending process.

However, the shaping method shown in FIG. 6 does not include a step of compressing a circumferential wall of a cylindrical member. Accordingly, in the case where the sealing can 3 shown in FIG. 3 is shaped using the shaping method shown in FIG. 6, the Vickers hardness of the rectilinear portion 17 is smaller than the Vickers hardness of the corner portion 18. This relationship in the magnitude of the Vickers hardness is the opposite to that of the sealing can 3 that is shaped using the shaping method shown in FIGS. 5A to 5E.

Figure 7A:
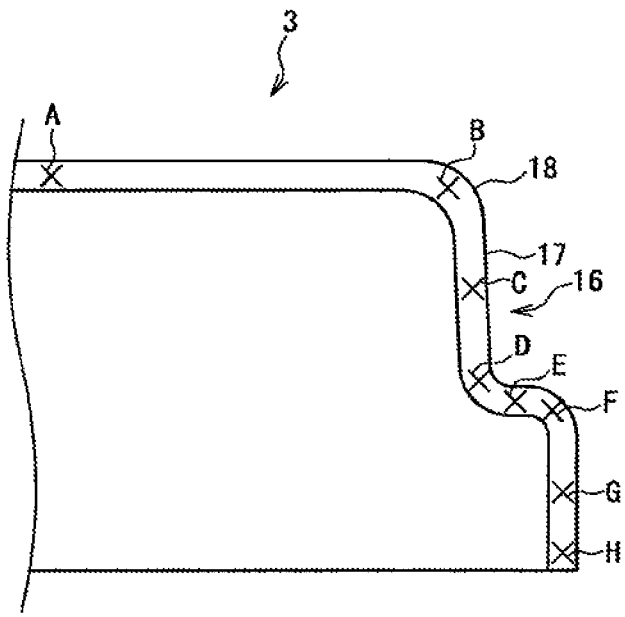
FIG. 7A is a diagram showing the points of measurement of the Vickers hardness in Working Example 1.
Figure 7B:
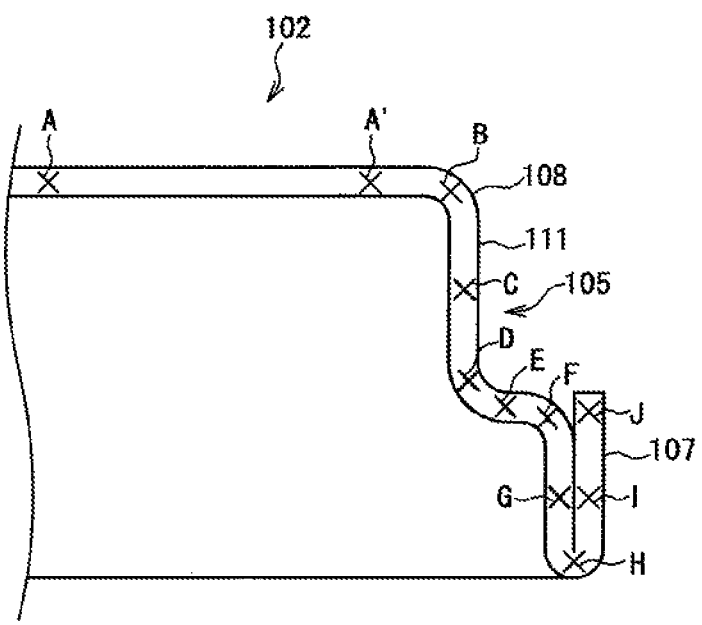
FIG. 7B is a diagram showing the points of measurement of the Vickers hardness in Comparative Example 1.

This will be described below with reference to the results of an experiment. FIGS. 7A and 7B show the points of measurement of the Vickers hardness in Working Example 1 and Comparative Example 1. FIG. 7A shows a relevant part of a sealing can 3 according to Working Example 1. Points A to H are the measuring points. Working Example 1 is a sealing can for a coin-shaped battery having a diameter of 20 mm and a height of 5 mm. The sealing can 3 of Working Example 1 has the same configuration as the sealing can 3 shown in FIG. 3, and a side wall portion 16 is a single layer wall without a folded-back portion. Moreover, the sealing can of Working Example 1 is shaped using the shaping method shown in FIGS. 5A to 5E, where processing is performed on a disk-like workpiece that has been blanked.

FIG. 7B shows a relevant part of a sealing can 102 according to Comparative Example 1. Points A, A, and B to J are the measuring points. Comparative Example 1 is a sealing can for a coin-shaped battery having a diameter of 24.5 mm and a height of 5 mm. The sealing can 102 of Comparative Example 1 has the same configuration as the sealing can 102 shown in FIG. 38, and a folded-back portion 107 is formed in a side wall portion 105. Moreover, the sealing can of Comparative Example 1 is shaped using the shaping method shown in FIG. 6, where processing is performed on a workpiece that is integral with the coil material 50.

Figure 8:
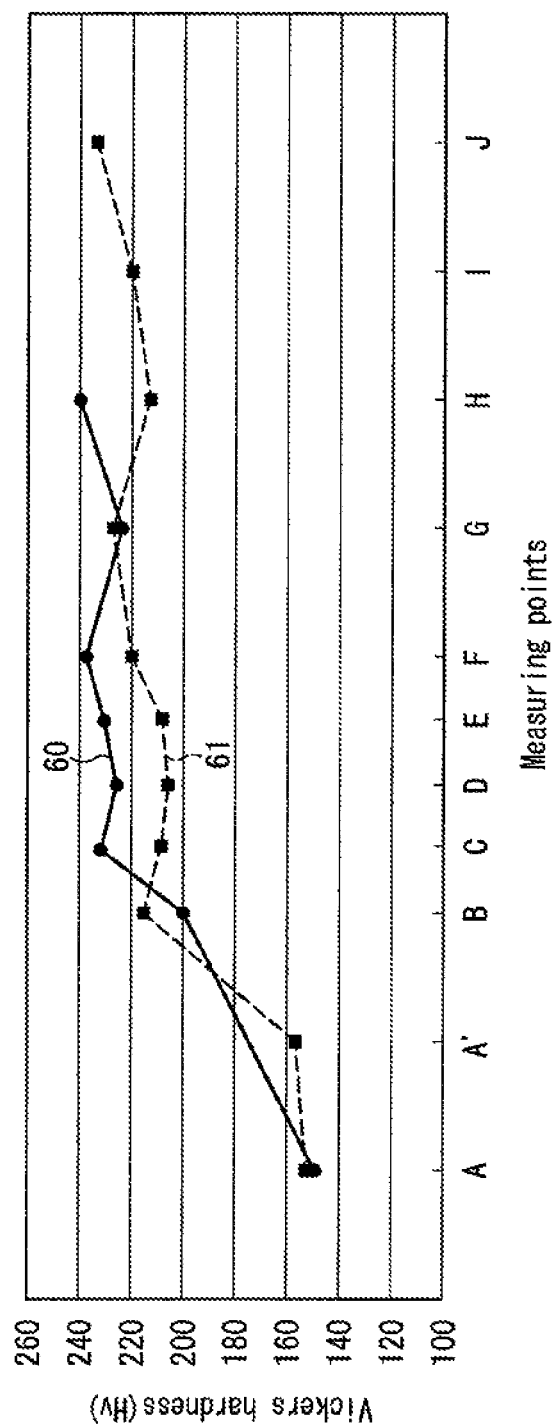
FIG. 8 is a graph showing the relationship between the measuring points and the Vickers hardness for Working Example 1 and Comparative Example 1.

FIG. 8 shows the relationship between the measuring points and the Vickers hardness for Working Example 1 and Comparative Example 1. A solid line 60 represents Working Example 1, and a dashed line 61 represents Comparative Example 1. For both of Working Example 1 and Comparative Example 1, the hardness at a point B (corner portion) is a higher value than the hardness at a point A or A (bottom portion). This can be considered to be a result of work hardening of the corner portion due to the bending process. This also applies to points D and F, which are corner portions of Working Example 1 and Comparative Example 1, and a point H, which is a folded portion, of Comparative Example 1.

Here, work hardening occurs not only in a bent portion but also in the vicinity thereof. Thus, in Working Example 1, it is considered that work hardening also occurs at the points C, E, and G in the vicinity of the corner portions. Moreover, in Working Example 1, the entire circumferential wall is work hardened by the beating step, so that work hardening occurs even at the point H distant from the corner portions.

In Comparative Example 1, work hardening also occurs at the points C and E in the vicinity of the corner portions and even at the point G in the vicinity of both the corner portion (point F) and the folded portion (point H).

Therefore, in both of Working Example 1 and Comparative Example 1, a high value of hardness is maintained between the point B and the point H.

Meanwhile, between the point B and the point H, a comparison between Working Example 1 and Comparative Example 1 indicates that the hardness of Working Example 1 (solid line 60) is greater than the hardness of Comparative Example 1 (dashed line 61) in almost the entire range between the point B and the point H. In particular, the hardness at the point C (rectilinear portion 111) is lower than the hardness at the point B (corner portion 108) in Comparative Example 1 (dashed line 61), whereas the hardness at the point C (rectilinear portion 17) is a higher value than the hardness at the point B (corner portion 18) in Working Example 1 (solid line 60).

This can be considered to be a result of the difference between the shaping methods of Working Example 1 and Comparative Example 1. In other words, it can be considered that the difference in the relationship of the magnitude of hardness between the points B and C between Working Example 1 and Comparative Example 1 results from the fact that, as described above, work hardening due to the beating step shown in FIG. 5C can be obtained in Working Example 1, whereas a step corresponding to the beating step is not performed in Comparative Example 1.

Here, in FIG. 2, the distal end portion 12a of the circumferential wall 12 of the exterior can 2 is bent in a direction toward the central axis 9 to form a curve. The exterior can 2 is thus fixed to the sealing can 3 by crimping. When the hardness at the point C (rectilinear portion 17) is higher than the hardness at the point B (corner portion 18) as in Working Example 1, deformation of the rectilinear portion 17 of the sealing can 3 is suppressed, which is advantageous in ensuring the sealing properties provided by the gasket 4. This will be described in detail with reference to FIGS. 2, 13A and 13B after the following description of a manufacturing process with reference to FIGS. 9 to 12.

Figure 9A:
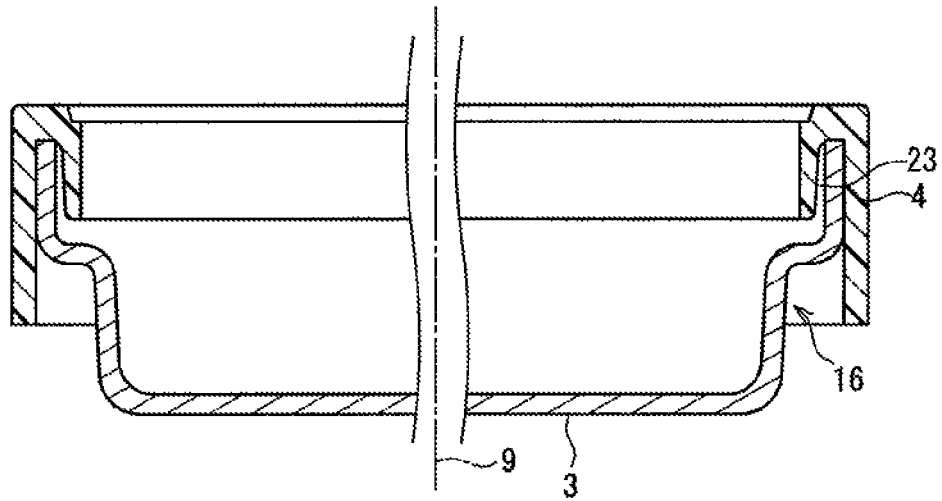
FIGS. 9A and 9B are cross-sectional views of the flat battery according to Embodiment 1 of the present invention in the middle of assembly, where
Figure 9B:
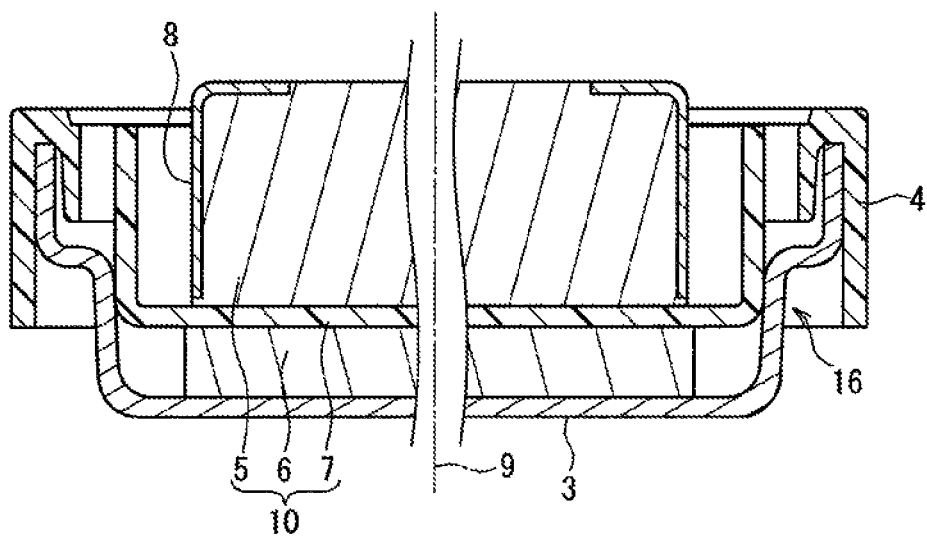

During assembly of the components shown in FIG. 3, assembly is advanced with the components being turned upside down from the orientation shown in FIG. 3. FIGS. 9A and 9B show cross-sectional views of a state in the middle of assembly. FIG. 9A is a cross-sectional view showing a state in which the gasket 4 is installed on the sealing can 3. The circumferential wall 16 of the sealing can 3 is inserted into the gap 23 of the gasket 4, thereby installing the gasket 4 on the sealing can 3.

FIG. 9B shows a state in which the power generating element 10 is housed in the sealing can 3. The negative electrode material 6 is fixed to the sealing can 3 with a conductive adhesive or the like. The separator 7 and the positive electrode material 5 are laid on top of the negative electrode material 6. Then, the nonaqueous electrolyte is injected into the sealing can 3.

Figure 10:
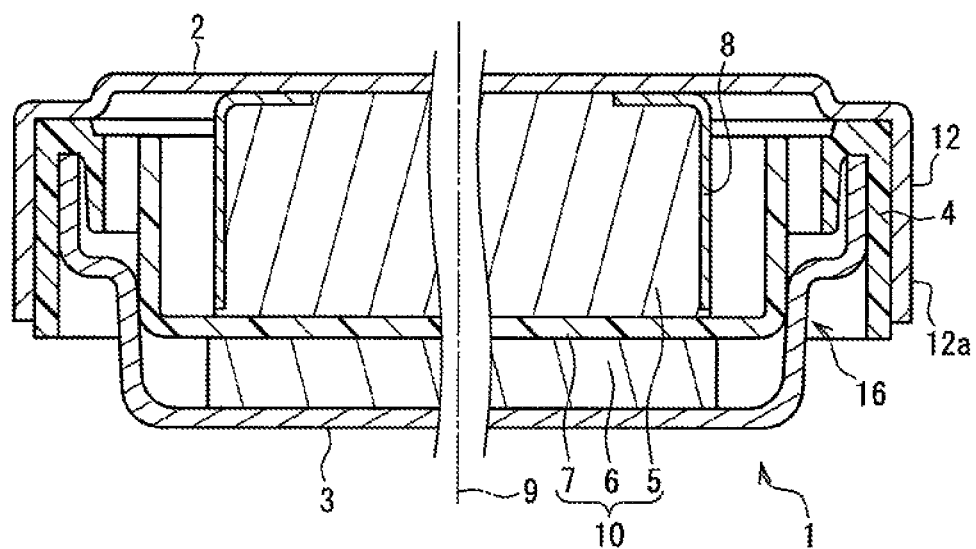
FIG. 10 is a cross-sectional view showing a state in which an exterior can 2 is fitted on an assembly shown in FIG. 9B.

FIG. 10 is a cross-sectional view showing a state in which the exterior can 2 is fitted on an assembly shown in FIG. 9B. In this state, an outer circumferential face of the gasket 4 is fitted against the inner circumferential face of the circumferential wall 12 of the exterior can 2. The components are assembled into the state shown in FIG. 10 before the process proceeds to a crimping step. In the crimping step, the distal end portion 12a of the circumferential wall 12 of the exterior can 2 is bent toward the central axis 9 of the sealing can 3 to form a curve.

Figure 11:
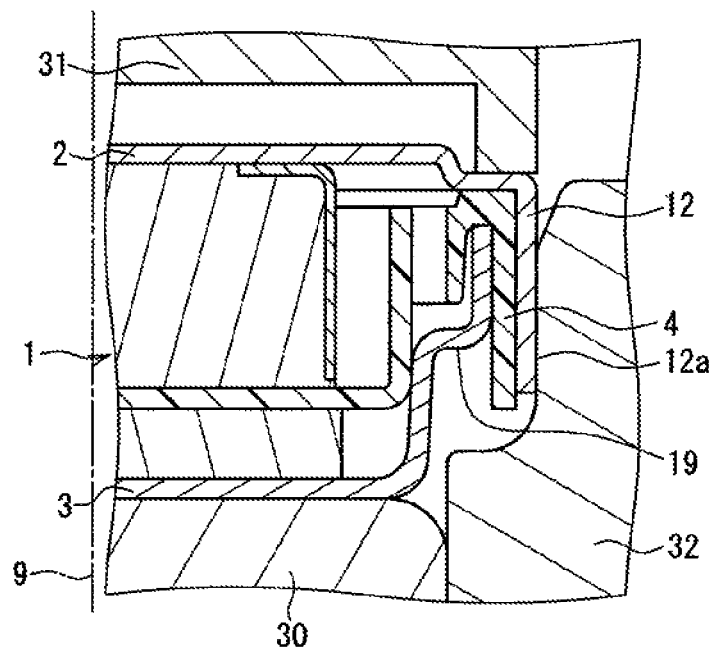
FIG. 11 is a cross-sectional view showing a state before crimping according to Embodiment 1 of the present invention.

FIG. 11 is a cross-sectional view showing a state before crimping. The flat battery 1 shown in FIG. 10 is sandwiched between a knockout pin 30 and a punch 31. A die face of a sealing die 32 fits over an outer circumferential face of the circumferential wall 12 so as to surround the circumferential wall 12 of the exterior can 2. In this state, the knockout pin 30 and the punch 31 are moved down. Thus, the distal end portion 12a of the circumferential wall 12 of the exterior can 2 is bent along a curved face of the sealing die 32 toward the central axis 9 of the sealing can 3.

Figure 12:
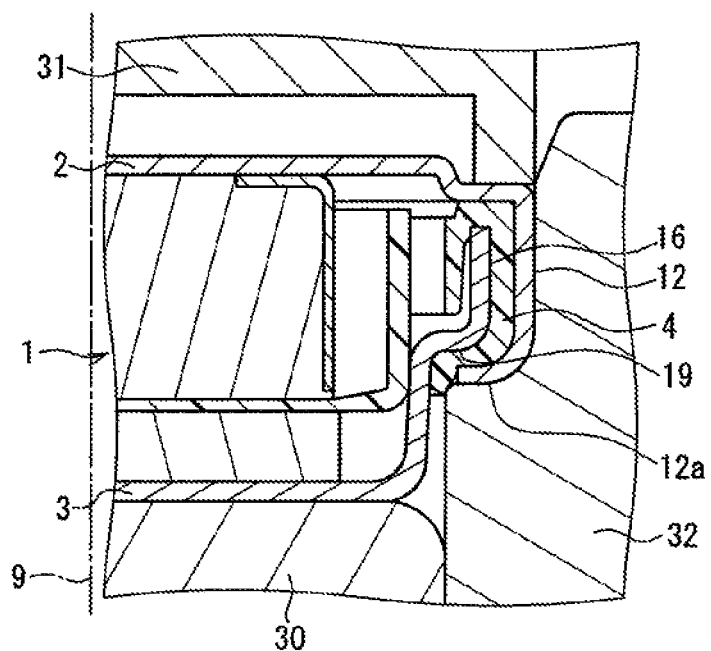
FIG. 12 is a cross-sectional view showing a state after crimping according to Embodiment 1 of the present invention.

FIG. 12 is a cross-sectional view showing a state in which the downward movement of the knockout pin 30 and the punch 31 is completed. In this state, the gasket 4 is sandwiched between the inner circumferential face of the circumferential wall 12 of the exterior can 2 and the outer circumferential face of the circumferential wall 16 of the sealing can 3.

Furthermore, an end portion of the gasket 4 is pressed against the circumferential wall 16 of the sealing can 3 so as to press the circumferential wall 16 toward the central axis 9. This provides good insulation properties and sealing properties between the exterior can 2 and the sealing can 3 having different polarities.

Moreover, between the shoulder portion 19 of the sealing can 3 and the distal end portion 12a of the circumferential wall 12 of the exterior can 2, the gasket 4 is pressed in a height direction of the sealing can 3. This also provides good insulation and sealing properties between the exterior can 2 and the sealing can 3.

In a finished product state after the crimping process shown in FIG. 2, the distal end portion 12a of the circumferential wall 12 of the exterior can 2 is bent toward the central axis 9 of the sealing can 3. During bending, an external force that acts to deform the circumferential wall 16 toward the central axis 9 is applied to the circumferential wall 16 of the sealing can 3. When the circumferential wall 16 is deformed toward the central axis 9, the circumferential wall 16 is displaced away from the gasket 4. This results in a decrease in the sealing properties provided by the gasket 4.

Figure 38:
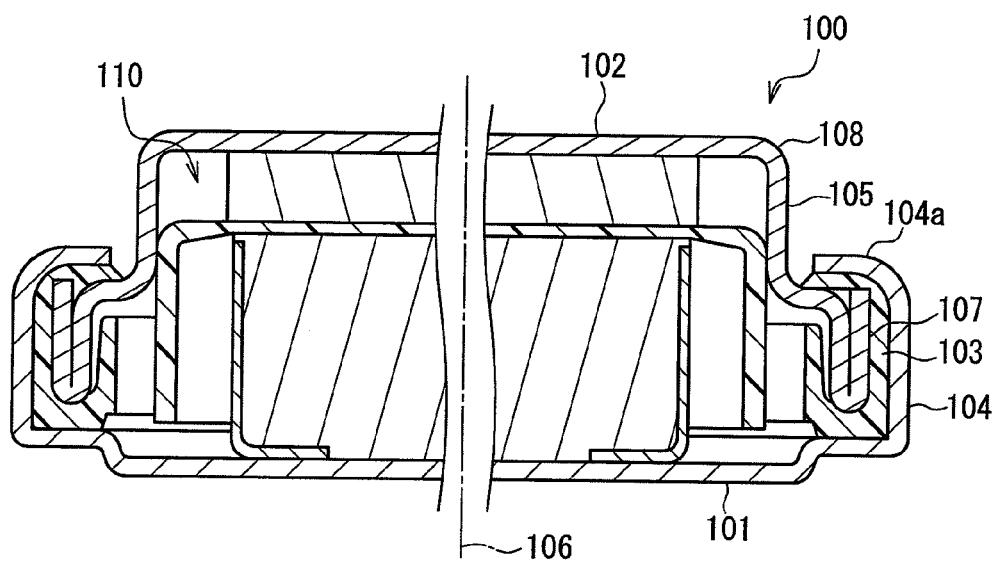
FIG. 38 is a cross-sectional view taken along line FF in FIG. 37.

In Comparative Example 1, as shown in FIG. 38, the folded-back portion 107 is formed to increase the strength, thereby preventing the sealing properties from decreasing. On the other hand, in the case of a circumferential wall that is a single layer wall without the folded-back portion 107, the entire circumferential wall is displaced toward the central axis, which is disadvantageous in ensuring the sealing properties.

Specifically, in the configuration shown in FIG. 2, the corner portion 18 can be work hardened by the bending process. Even in the case where the corner portion 18 with an increased hardness is not deformed during the crimping process, if the rectilinear portion 17 is deformed, the entire circumferential wall 16, which is a single layer wall, is displaced toward the central axis 9, resulting in a disadvantage in ensuring the sealing properties provided by the gasket 4.

On the other hand, in the configuration shown in FIG. 2, when not only the corner portion 18 of the sealing can 3 but also the rectilinear portion 17 of the circumferential wall 16 has an increased hardness, displacement of the entire circumferential wall 16 toward the central axis 9 is suppressed even in the case where the circumferential wall 16 is a single layer wall, and the sealing properties thus can be prevented from decreasing.

As described above, in Working Example 1, the hardness of the rectilinear portion 17 is greater than the hardness of the corner portion 18. In other words, the sealing can 3 according to Embodiment 1 satisfies the relationship of an expression (1) below, where the Vickers hardness of the corner portion 18 of the sealing can 3 is Hv1, and the Vickers hardness of the rectilinear portion 17 is Hv2.

$$Hv1 < Hv2 \qquad \text{Expression (1)}$$

With this configuration, the corner portion 18 has an increased hardness due to work hardening as a result of the bending process, and the rectilinear portion 17 has a higher hardness than the corner portion 18. Therefore, during the crimping process, deformation of both the corner portion 18 and the rectilinear portion 17 is suppressed, and the sealing properties also can be prevented from decreasing.

To make the effect obtained by satisfying the expression (1) more certain, preferably, the relationship of an expression (2) below is satisfied. Referring to FIG. 8, in Working Example 1, the value at the point C (rectilinear portion 17) is about 1.15 times higher than the value at the point B (corner portion 18), and the sealing properties are ensured. When this is taken into account, the range of an expression (3) below is more preferable.

$$1.05 \leq Hv2/Hv1 \quad \text{Expression (2)}$$

$$1.10 \leq Hv2/Hv1 \quad \text{Expression (3)}$$

Meanwhile, when the limit of work hardening achieved by the beating process is taken into account, Hv2/Hv1 is preferably within the range of an expression (4) below.

$$Hv2/Hv1 \leq 1.6 \quad \text{Expression (4)}$$

Numerical examples of the ratio between Hv1 and Hv2 are described above, and preferred numerical ranges of Hv1 and Hv2 are as described below. A stainless steel material such as SUS430 is usually used as the material for the sealing can 3, and the numerical ranges below are derived from the extent of work hardening caused by bending of the corner portion and the extent of work hardening caused by the beating process, in the case of SUS430.

The Vickers hardness Hv1 of the corner portion 18 is preferably within the range of an expression (5) below, more preferably within the range of an expression (6) below, and even more preferably within the range of an expression (7) below.

$$150 \leq Hv1 \quad \text{Expression (5)}$$

$$170 \leq Hv1 \quad \text{Expression (6)}$$

$$190 \leq Hv1 \quad \text{Expression (7)}$$

The Vickers hardness Hv2 of the rectilinear portion 17 is preferably within the range of an expression (8) below, more preferably within the range of an expression (9) below, and even more preferably within the range of an expression (10) below.

$$200 \leq Hv2 \quad \text{Expression (8)}$$

$$210 \leq Hv2 \quad \text{Expression (9)}$$

$$220 \leq Hv2 \quad \text{Expression (10)}$$

Meanwhile, processing for increasing the hardness of the corner portion 18 is difficult, and an excessively high hardness of the corner portion 18 also makes it difficult to increase the hardness of the rectilinear portion 17 to a higher level than the hardness of the corner portion 18. For this reason, the hardness of the corner portion 18 is preferably within the range of an expression (11) below and more preferably within the range of an expression (12) below.

$$Hv1 \leq 210 \quad \text{Expression (11)}$$

$$Hv1 \leq 200 \quad \text{Expression (12)}$$

Figure 13A:
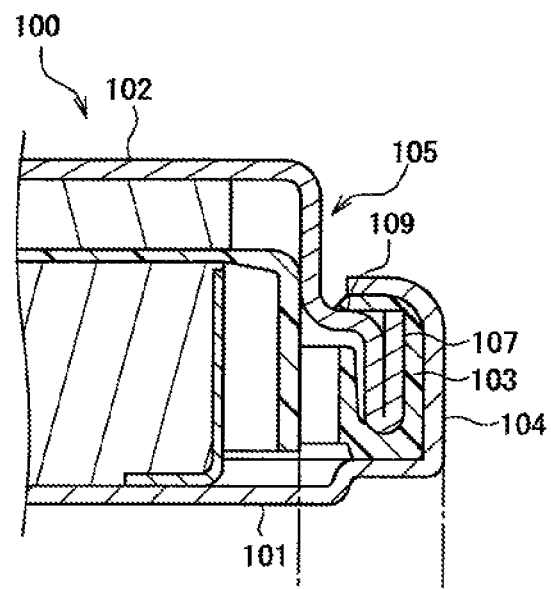
FIGS. 13A and 13B are cross-sectional views for performing a comparison between Embodiment 1 of the present invention and a comparative example, where
Figure 13B:
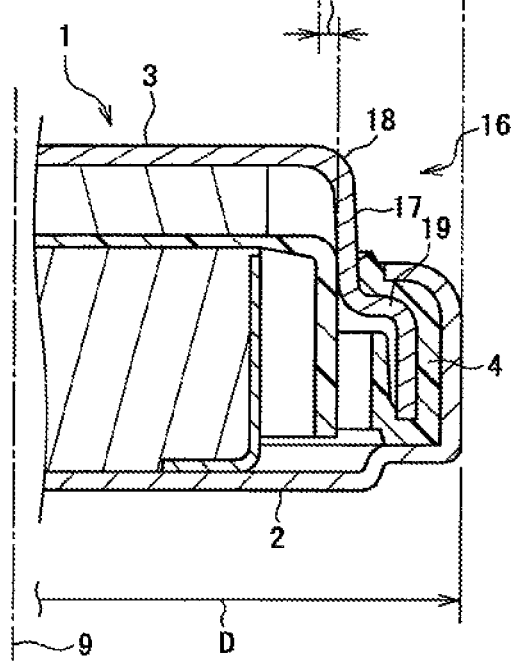

Next, Embodiment 1 will be compared with a comparative example with reference to FIGS. 13A and 13B. FIG. 13A is a cross-sectional view of a relevant part of a flat battery 100 according to the comparative example. FIG. 13A shows the same configuration as the conventional example shown in FIG. 38. FIG. 13B is a cross-sectional view of a relevant part of the flat battery 1 according to Embodiment 1. FIG. 13B shows the same configuration as the flat battery 1 shown in FIG. 2.

Both the flat battery 100 and the flat battery 1 have the same external dimension D. A folded-back portion 107 is formed in a sealing can 102 of the flat battery 100, whereas the circumferential wall 16 of the flat battery 1 is a single layer wall without being folded back.

Even when the folded-back portion 107 is omitted from the sealing can 102, the amount of engagement between a shoulder portion 109 of a circumferential wall 105 and a gasket 103 is not changed. In this case, the entire circumferential wall 105 of the sealing can 102 can be shifted toward a circumferential wall 104 of an exterior can 101 by an amount corresponding to the folded-back portion 107 that has been omitted.

The state after shifting corresponds to FIG. 13B. In the flat battery 1 shown in FIG. 13B, the inner circumferential face of the sealing can 3 is shifted outward by a dimension A as compared with the flat battery 100 shown in FIG. 13A. Accordingly, the flat battery 1 can have a larger capacity than the flat battery 100 even though the flat battery 1 has the same external dimension D as the flat battery 100.

Moreover, formation of the rectilinear portion 17 also provides an advantage in ensuring sufficient capacity. In FIG. 13B, an increase in the radius of the corner portion 18 causes the rectilinear portion 17 to become a part of the corner portion 18. With this configuration, the corner portion 18 is displaced toward the central axis 9, which is disadvantageous in ensuring sufficient capacity. In other words, the smaller the radius of the corner portion 18 and the greater the length of the rectilinear portion 17, the larger the capacity can be.

Meanwhile, as described above, the flat battery 1 satisfies the relationship of the expression (1), and so the corner portion 18 has an increased hardness due to work hardening as a result of the bending process, and the rectilinear portion 17 has a higher hardness than the corner portion 18.

Therefore, according to Embodiment 1, even though the circumferential wall 16 of the sealing can 3 is a single layer wall, deformation of both the corner portion 18 and the rectilinear portion 17 can be suppressed during the crimping process, and the sealing properties provided by the gasket 4 can be ensured.

In other words, it can be said that Embodiment 1 has an advantageous configuration that ensures the sealing properties provided by the gasket 4 while employing a single layer wall without being folded back for the circumferential wall 16 of the sealing can 3, which is an advantageous structure in increasing the capacity.

It should be noted that in the sealing can 3 according to Embodiment 1, the rectilinear portion 17 is formed in the cross-sectional shape of the circumferential wall 16 both before and after crimping. Meanwhile, an external force is applied to the circumferential wall 16 by the crimping process. Thus, in some cases, the perfectly rectilinear shape of the rectilinear portion 17 cannot be maintained after the crimping process. Even with such a configuration, the effect of increasing the sealing properties provided by the gasket 4 still can be obtained.

Therefore, the shape of the rectilinear portion 17 includes not only a perfect straight line but also a curved line that has a large radius of curvature and can be regarded as a straight line. More specifically, it should be construed that the shape of the rectilinear portion 17 includes a curved line having a radius of curvature of 5 mm or more or a curved line having a radius of curvature that is 20 times or more greater than the radius of the corner portion 18.

Moreover, although the dimensions of the flat battery 1 and the materials for the components thereof are described using FIGS. 1 to 3, these dimensions and materials are described by way of example. The flat battery 1 may have dimensions different from those described above, and materials different from those described above may be used.

Embodiment 2

Figure 14:
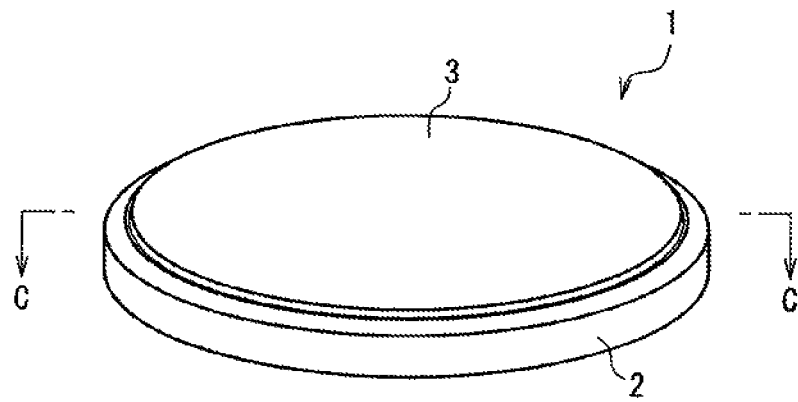
FIG. 14 is a perspective view of a flat battery according to Embodiment 2 of the present invention.

FIG. 14 shows a perspective view of a flat battery according to Embodiment 2 of the present invention. A flat battery 1 is constructed by combining an exterior can 2 serving as a positive electrode can and a sealing can 3 serving as a negative electrode can. An example of the flat battery 1 has an external diameter dimension (dimension D in FIG. 2) of 20.0 mm and a thickness of 5 mm.

Figure 15:
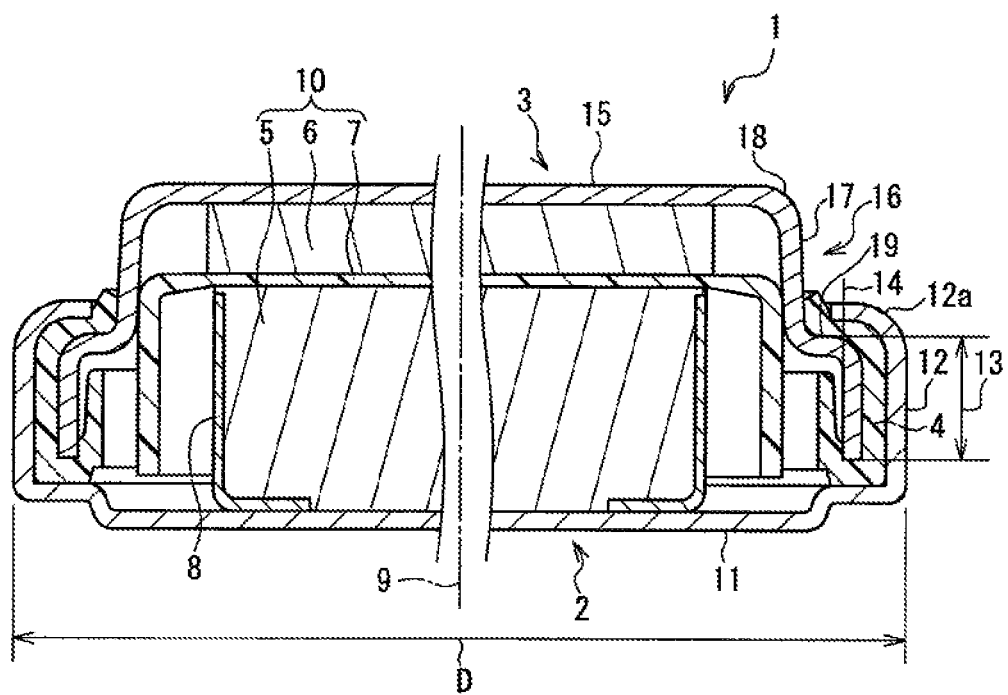
FIG. 15 is a cross-sectional view taken along line CC in FIG. 14.

FIG. 15 is a cross-sectional view taken along line CC in FIG. 14. The exterior can 2 includes a bottom portion 11 and a circumferential wall 12 extending upright from an outer circumference of the bottom portion 11 and has a cylindrical shape that is open at one end. The sealing can 3 includes a bottom portion 15 and a circumferential wall 16 extending upright from an outer circumference of the bottom portion 15 and has a cylindrical shape that is open at one end. A gasket 4 is interposed between an inner circumferential face of the circumferential wall 12 of the exterior can 2 and an outer circumferential face of the circumferential wall 16 of the sealing can 3.

A distal end portion 12a of the circumferential wall 12 of the exterior can 2 is bent toward a central axis 9 of the sealing can 3 to form a curve, whereby the exterior can 2 is fixed to the sealing can 3 by crimping. Thus, a gap between the exterior can 2 and the sealing can 3 is sealed with the gasket 4, and the exterior can 2 and the sealing can 3 having different polarities are insulated from each other.

The flat battery 1 houses a power generating element 10 and is filled with a nonaqueous electrolyte. The power generating element 10 includes a positive electrode material (electrode material) 5 made of a positive electrode active material and the like pressed into the shape of a disk, a negative electrode material (electrode material) 6 made of metallic lithium or an lithium alloy, which are negative electrode active materials, formed into the shape of a disk, and a non-woven fabric separator 7. The separator 7 is disposed between the positive electrode material 5 and the negative electrode material 6. A positive electrode ring 8 formed of stainless steel or the like is installed on an outer face of the positive electrode material 5.

Figure 16:
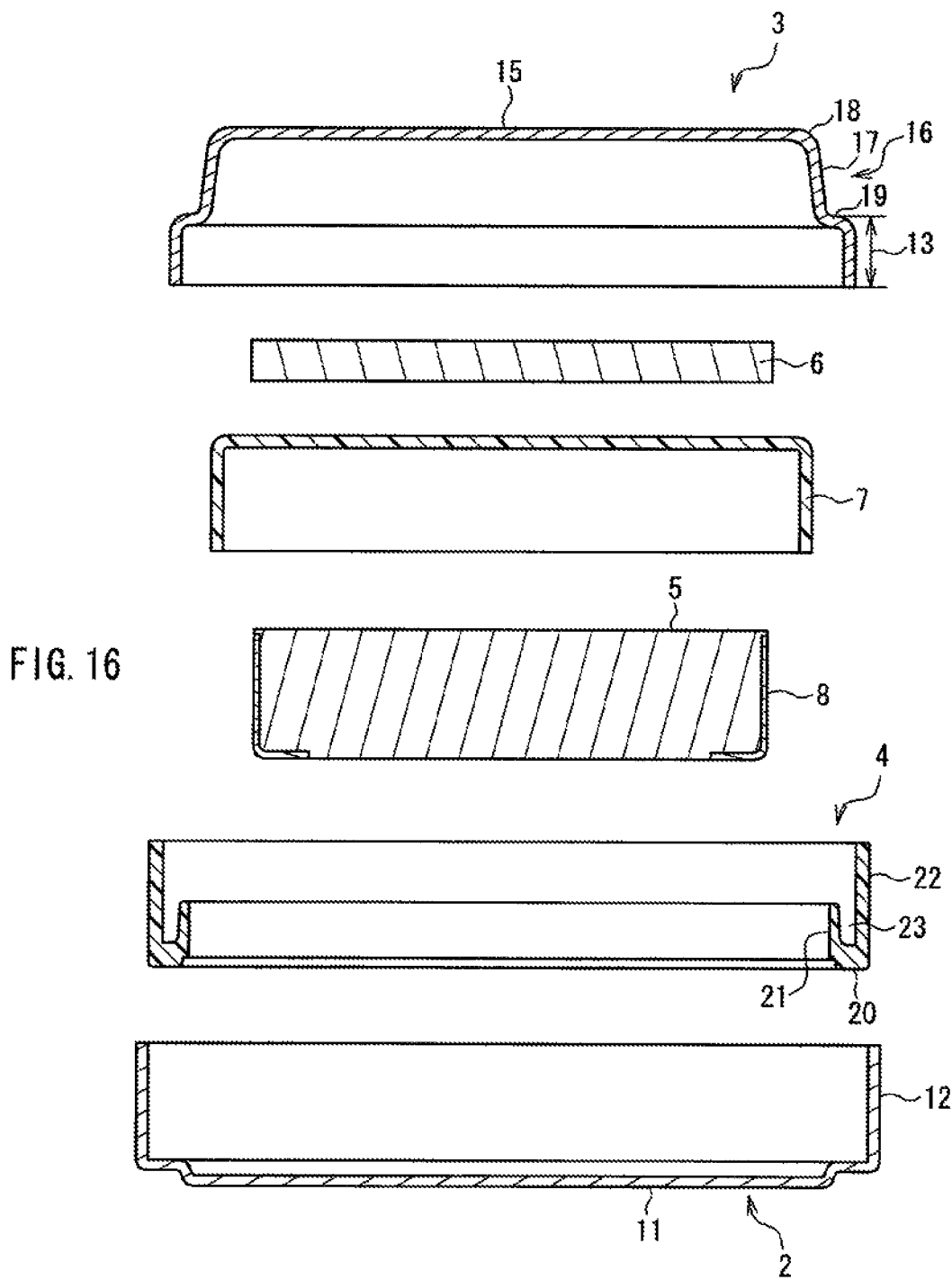
FIG. 16 is an exploded view of the flat battery 1 shown in FIG. 15.

FIG. 16 shows an exploded view of the flat battery 1 shown in FIG. 15. As described above, the exterior can 2 and the sealing can 3 have cylindrical shapes that are open at one end. These cans can be shaped by, for example, press forming a stainless steel material. The circumferential wall portion 16 of the sealing can 3 includes a rectilinear portion 17, and a corner portion 18 is formed at the intersection of the bottom portion 15 and the rectilinear portion 17. Furthermore, the circumferential wall portion 16 is stepped at a shoulder portion 19.

The gasket 4 is a resin molded article and is made by molding a resin composition containing, for example, polyphenylene sulfide (PPS) as a main ingredient and an olefin elastomer. The gasket 4 is a ring-like member and includes a base portion 20 and inner and outer walls 21 and 22 extending upwardly from the base portion 20. A gap 23 is formed between the inner wall 21 and the outer wall 22. The circumferential wall 16 of the sealing can 3 can be inserted into this gap 23.

The positive electrode material 5 is made by shaping the positive electrode active material integrally with the positive electrode ring 8 into the shape of a disk. Examples of the positive electrode active material include those obtained by shaping a positive electrode mixture prepared by mixing, for example, graphite, a tetrafluoroethylene-hexafluoropropylene copolymer, and hydroxypropylcellulose into manganese dioxide.

The separator 7 is formed of a non-woven fabric, and the material for the non-woven fabric is, for example, a fiber made of polybutylene terephthalate.

The separator 7 is impregnated with a nonaqueous electrolyte. For example, a solution of $LiClO_4$ dissolved in a solvent prepared by mixing propylene carbonite with 1,2-dimethoxyethane can be used as the nonaqueous electrolyte. The separator 7 has a thickness of, for example, about 0.3 to 0.4 mm.

The configuration of the flat battery 1 is schematically described above. However, the flat battery 1 according to Embodiment 2 is characterized by the distribution of hardness and thickness in the sealing can 3. Specifically, an upright portion 13, of the circumferential wall 16 of the sealing can 3 shown in FIG. 15, has a greater thickness than the thickness of the corner portion 18. Furthermore, the Vickers hardness of the upright portion 13 is greater than the Vickers hardness of the corner portion 18.

The upright portion 13 is a portion sandwiched between the curved distal end portion 12a of the circumferential wall 12 of the exterior can 2 and the bottom portion 11 of the exterior can 2. In the shoulder portion 19, a part outside of a line 14 extending from an inner face of the upright portion 13 is included in the upright portion 13.

As will be described later in detail, the purpose of forming the upright portion 13 having a greater hardness and thickness is to suppress deformation of the circumferential wall 16 of the sealing can 3 during a crimping process by which the distal end portion 12a of the circumferential wall 12 of the exterior can 2 is bent into a curve and thereby ensuring the sealing properties provided by the gasket 4.

Here, the Vickers hardness is a hardness that is measured in conformity with JIS Z 2244. In such a measurement, the surface of a test piece is indented using a diamond indenter having the shape of a quadrangular pyramid with an angle of 136° between opposite faces, and the surface area of the resulting permanent indentation is calculated from the diagonal length of the permanent indentation. The Vickers hardness is obtained from a value calculated by dividing the test load applied to the indenter when the indentation is made by the surface area of the permanent indentation.

Figure 17:
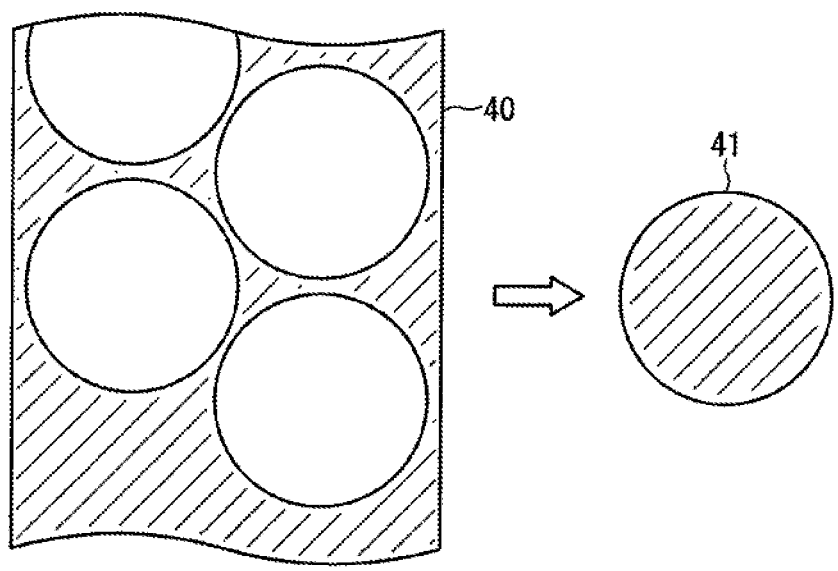
FIG. 17 is a diagram showing a state in which a disk-like member is blanked from a plate material according to Embodiment 2 of the present invention.

Hereinafter, a shaping method for obtaining the upright portion 13 of the sealing can 3 as above will be described with reference to FIGS. 17 and 18A to 18E. FIG. 17 shows a state in which a disk-like member 41 is blanked from a plate material 40 that is the raw material for the sealing can 3. A transfer press is used to process the disk-like member 41. The transfer press is a press machine including dies corresponding to individual steps of multiple steps and a transfer mechanism that transfers a workpiece to the subsequent step. The disk-like member 41 is processed using the dies corresponding to the individual steps and formed into the shape shown in FIG. 16.

Figure 18A:
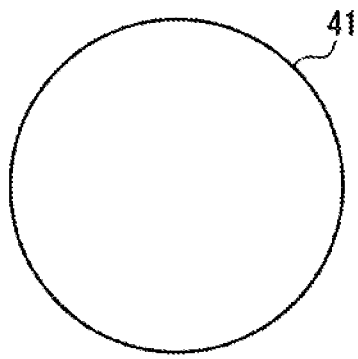
FIGS. 18A to 18E is a diagram showing the change in the shape of a workpiece after undergoing each step according to Embodiment 2 of the present invention.
Figure 18D:
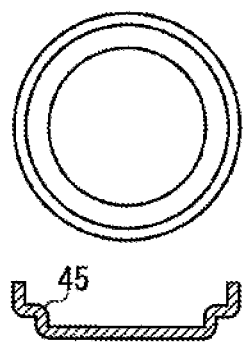
Figure 18B:
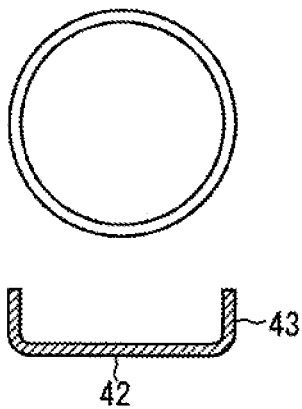

FIGS. 18A to 18E show the change in the shape of the workpiece after undergoing each step. Each of FIGS. 18A to 18E shows a plan view and a cross-sectional view. FIG. 18A shows the disk-like member 41. As described above, the disk-like member 41 is blanked from the plate material 40 as shown in FIG. 17. In FIG. 18B, the disk-like member 41 is drawn into a cylindrical shape that includes a bottom portion 42 and a circumferential wall 43 extending upright from an outer circumference of the bottom portion 42.

Figure 18E:
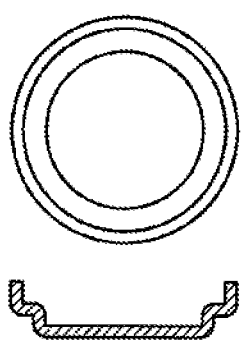
Figure 18C:
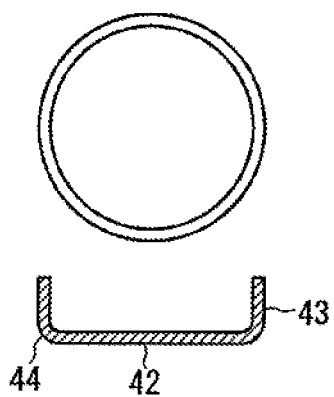

FIG. 18C shows a state of the workpiece after undergoing a beating step. In the state of FIG. 18C, the workpiece still has a cylindrical shape, but the height of the circumferential wall 43 is adjusted by beating the circumferential wall 43.

This height adjustment causes the circumferential wall 43 to be deformed under compression and work hardened. As described above, the thickness and Vickers hardness of the upright portion 13 of the circumferential wall 16 of the sealing can 3 are increased through deformation under compression during the beating step and work hardening associated with the deformation.

FIG. 18D shows a state in which a shoulder portion 45 is formed by processing a corner portion 44 of the workpiece shown in FIG. 18C. FIG. 18E shows a completed state after finishing. The completed sealing can has the same shape as the sealing can 3 shown in FIG. 16.

On the other hand, the sealing can 3 shown in FIG. 16 also can be shaped by press working using a progressive die. However, a beating step cannot be included in this processing method, and so the thickness and hardness of the upright portion 13 (FIG. 15) of the circumferential wall 16 cannot be made greater than those of the corner portion 18.

Figure 19:
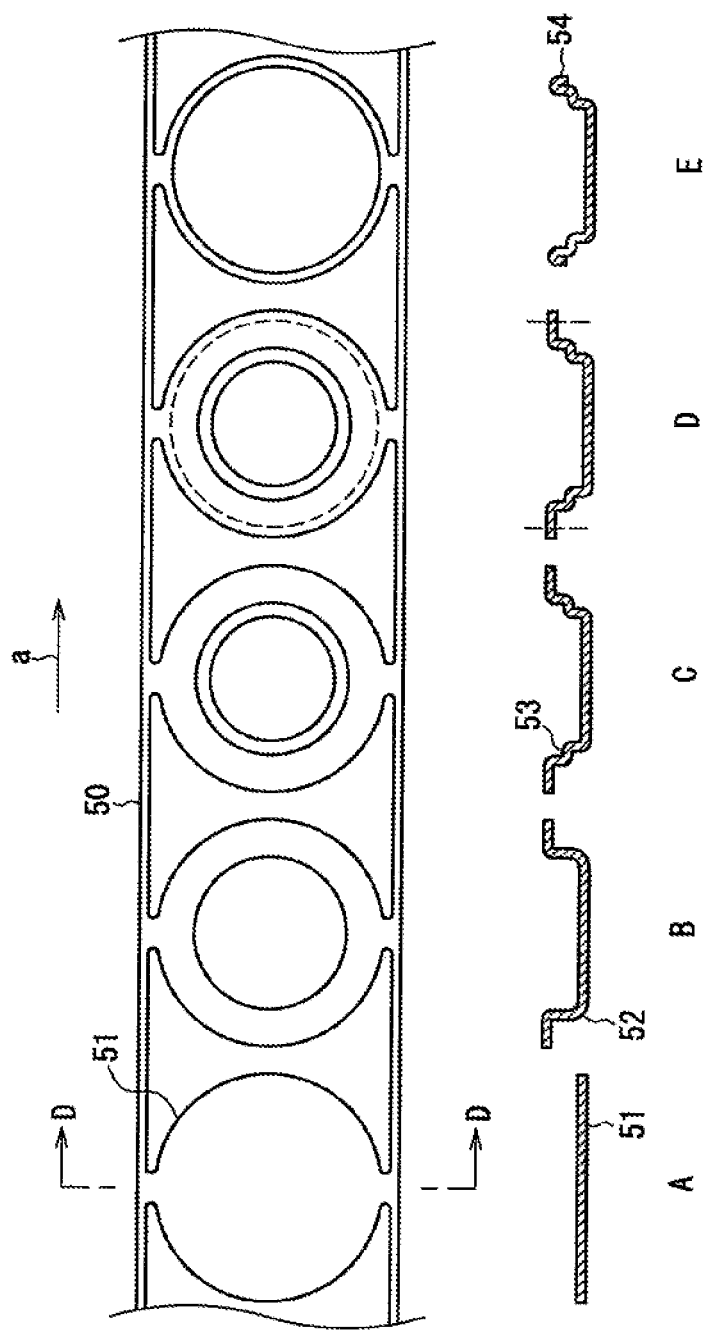
FIG. 19 is a diagram showing a method for shaping a sealing can according to a comparative example.

Hereinafter, a method for shaping the sealing can 3 using a progressive die will be described as a comparative example. FIG. 19 shows a plan view of a coil material 50 that is being processed using a progressive die. FIG. 19 also shows cross-sectional views of workpieces. Each of the cross-sectional views is a cross-sectional view of the coil material 50 taken in a width direction (cross-sectional view taken along line DD), but the cross-sectional views are arranged laterally for the convenience of illustration.

In the state shown in FIG. 19, each workpiece at A, B, or C is fed to the next station at a position B, C, or D by moving the coil material 50 forward by a distance corresponding to the interval between stations (in the direction of arrow a). In this state, the workpieces are processed into the shapes of the cross-sectional views at respective positions, in a single press stroke. That is to say, each time the coil material 50 is moved forward by a distance corresponding to the interval between stations, press operations at multiple stations are performed simultaneously.

A disk-like member 51 at A is processed into a drawn shape at B. A corner portion 52 of a workpiece having the drawn shape at B is processed so as to have the shape at C, in which a shoulder portion 53 is formed. At D, the workpiece processed into the shape at C is blanked along a dashed line and cut off from the coil material 50. An upper end portion 54 of the workpiece cut off from the coil material 50 is folded back as shown at E to form a shape corresponding to the folded-back portion 107 in FIG. 15. It is also possible to omit the operation at E and configure a circumferential wall as a single layer wall without a folded-back portion.

In the shaping method shown in FIG. 19, the workpiece remains integral with the coil material 50 while processing is proceeding. This shaping method is the same as the shaping method shown in FIGS. 18A to 18E in that the corner portion 52 can be work hardened by a bending process.

However, the shaping method shown in FIG. 19 does not include a step of compressing a circumferential wall of a cylindrical member, so processing that increases the thickness and hardness of the upright portion 13 (FIG. 15) to a higher level than those of the corner portion 18 cannot be performed.

Figure 20A:
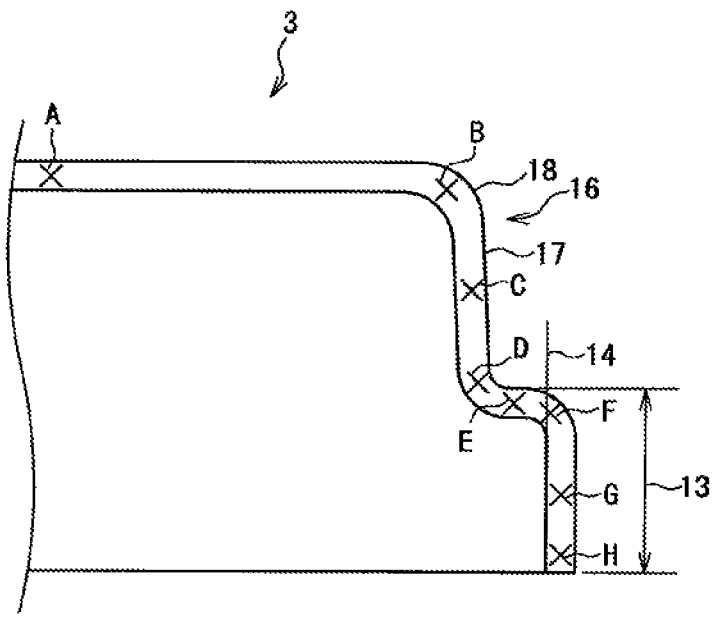
FIG. 20A is a diagram showing the points of measurement of the Vickers hardness in Working Example 2.
Figure 20B:
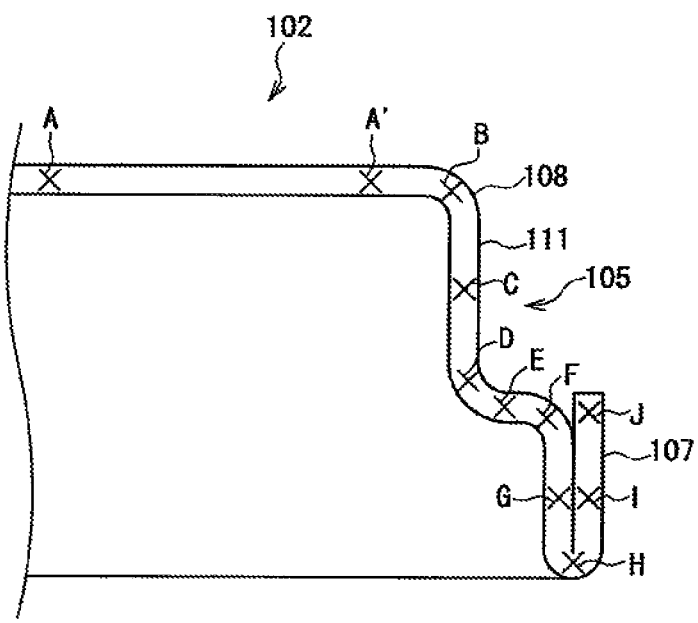
FIG. 20B is a diagram showing the points of measurement of the Vickers hardness in Comparative Example 2.

This will be described below with reference to the results of an experiment. FIGS. 20A and 20B show the points of measurement of the thickness and Vickers hardness in Working Example 2 and Comparative Example 2. FIG. 20A shows a relevant part of a sealing can 3 according to Working Example 2. Points A to H are the measuring points. The range of the upright portion 13 shown in FIG. 15 is shown in FIG. 20A. As described above, a part outside of the line 14 extending from the inner circumferential face of the upright portion 13 is included in the upright portion 13. Thus, the points F, G, and H are the measuring points within the upright portion 13.

Working Example 2 is a sealing can for a coin-shaped battery having a diameter of 20 mm and a height of 5 mm. The sealing can 3 of Working Example 2 has the same configuration as the sealing can 3 shown in FIG. 16, and a side wall portion 16 is a single layer wall without a folded-back portion. Moreover, the sealing can of Working Example 2 is shaped using the shaping method shown in FIGS. 18A to 18E, where processing is performed on a disk-like workpiece that has been blanked.

FIG. 20B shows a relevant part of a sealing can 102 according to Comparative Example 2. Points A, A, and B to J are the measuring points. Comparative Example 2 is a sealing can for a coin-shaped battery having a diameter of 24.5 mm and a height of 5 mm. The sealing can 102 of Comparative Example 2 has the same configuration as the sealing can 102 shown in FIG. 38, and a folded-back portion 107 is formed in a side wall portion 105. Moreover, the sealing can of Comparative Example 2 is shaped using the shaping method shown in FIG. 19, where processing is performed on a workpiece that is integral with the coil material 50.

Figure 21:
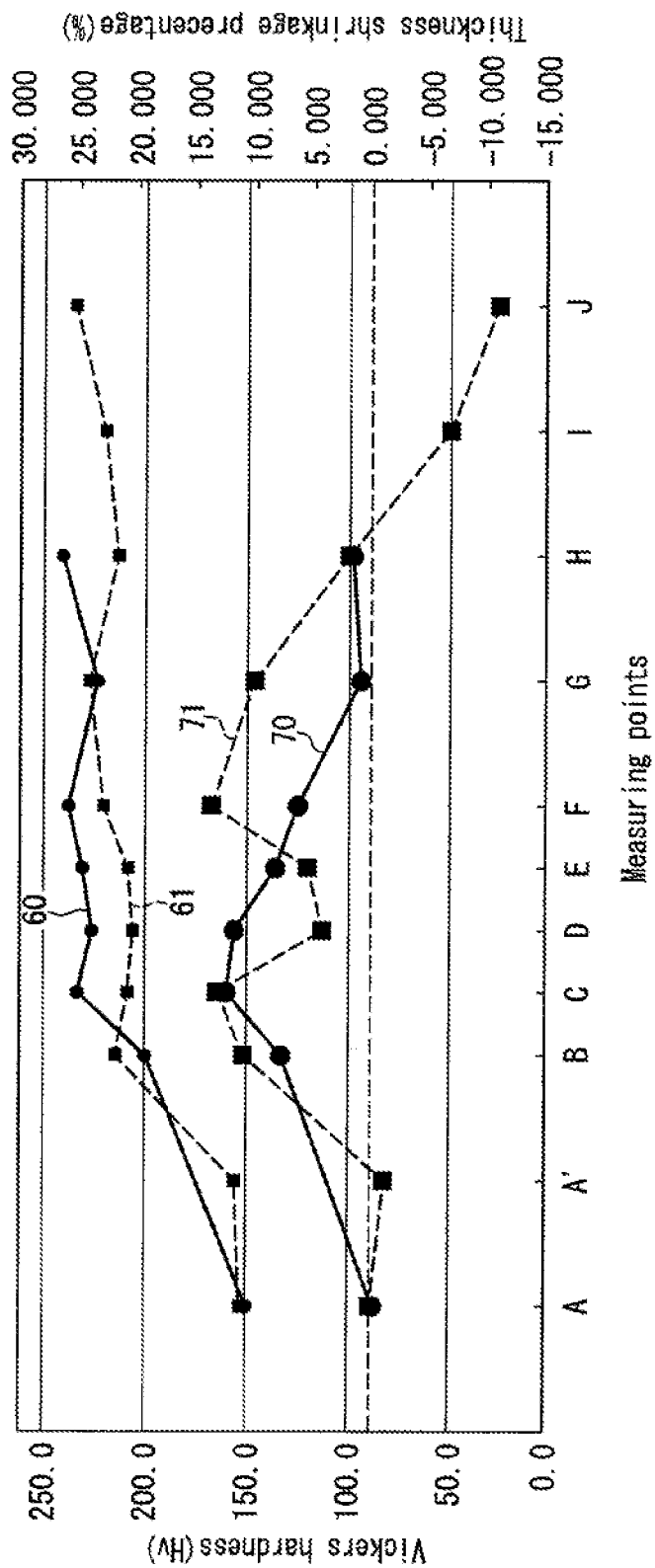
FIG. 21 is a graph showing the relationship between the measuring points and the Vickers hardness and the relationship between the measuring points and the thickness shrinkage percentage for Working Example 2 and Comparative Example 2.

FIG. 21 shows the relationship between the measuring points and the Vickers hardness and the relationship between the measuring points and the thickness shrinkage percentage for Working Example 2 and Comparative Example 2. A solid line 60 represents the Vickers hardness of Working Example 2, and a dashed line 61 represents the Vickers hardness of Comparative Example 2.

A solid line 70 represents the thickness shrinkage percentage of Working Example 2, and a dashed line 71 represents the thickness shrinkage percentage of Comparative Example 2. The thickness shrinkage percentage indicates the extent of shrinkage relative to the original thickness and is calculated using an expression (13) below. It is seen from the expression (13) that the greater the thickness shrinkage percentage, the thinner the thickness.

Thickness shrinkage percentage (%)=[(original thickness−measurement value)/original thickness]× 100     Expression (13)

First, a comparison between the solid line 60 and the dashed line 61, which represent the Vickers hardness, is performed. For both of Working Example 2 and Comparative Example 2, the hardness at the point B (corner portion) is a higher value than the hardness at the point A or A (bottom portion). This can be considered to be a result of work hardening of the corner portion due to the bending process. This also applies to the points D and F, which are corner portions of Working Example 2 and Comparative Example 2, and the point H, which is a folded portion, of Comparative Example 2.

Here, work hardening occurs not only in a bent portion but also in the vicinity thereof. Thus, in Working Example 2, it is considered that work hardening also occurs at the points C, E, and G in the vicinity of the corner portions.

Moreover, in Working Example 2, the entire circumferential wall 16 is work hardened by the beating step, so that work hardening occurs even at the point H distant from the corner portion (point F).

In Comparative Example 2, work hardening also occurs at the points C and E in the vicinity of the corner portions, and work hardening occurs even at the point G in the vicinity of both the corner portion (point F) and the folded portion (point H).

Therefore, in both of Working Example 2 and Comparative Example 2, a high value of hardness is maintained between the point B and the point H.

Meanwhile, between the point B and the point H, a comparison between Working Example 2 and Comparative Example 2 indicates that the hardness of Working Example 2 (solid line 60) is greater than the hardness of Comparative Example 2 (dashed line 61) in almost the entire range between the point B and the point H. In particular, the hardness at the point C (rectilinear portion 111) is lower than the hardness at the point B (corner portion 108) in Comparative Example 2 (dashed line 61), whereas the hardness at the point C (rectilinear portion 17) is a higher value than the hardness at the point B (corner portion 18) in Working Example 2 (solid line 60).

This can be considered to be a result of the difference between the shaping methods of Working Example 2 and Comparative Example 2. In other words, it can be considered that the difference in the relationship of the magnitude of hardness between the points B and C between Working Example 2 and Comparative Example 2 results from the fact that, as described above, work hardening due to the beating step shown in FIG. 18C can be obtained in Working Example 2, whereas a step corresponding to the beating step is not performed in Comparative Example 2.

Next, in FIG. 21, a comparison between the solid line 70 and the dashed line 71, which represent the thickness shrinkage percentage (%), is performed. The scale of the thickness shrinkage percentage (%) is shown on the right side of FIG. 21. The thickness shrinkage percentage of Working Example 2 (solid line 70) is smaller than the thickness shrinkage percentage of Comparative Example 2 (dashed line 71) in the entire range between the points F and H corresponding to the upright portion 13 in FIG. 20A.

Meanwhile, the thickness shrinkage percentage of Working Example 2 (solid line 70) at the points F to H is smaller than the thickness shrinkage percentage at the point B (corner portion 18). That is to say, in Working Example 2, the thickness at the points F to H corresponding to the upright portion 13 is greater than the thickness at the point B (corner portion 18). In contrast, the value at the point F of Comparative Example 2 (dashed line 71) exceeds the value at the point B (corner portion 108), so the thickness at the point F is smaller than that at the point B (corner portion 108).

As described above, in Working Example 2, both the hardness and the thickness of the upright portion 13 are greater than those of the corner portion 18 in FIG. 21A. Such an upright portion 13 can be formed because, as described above, the shaping method of Working Example 2 includes a beating step, which is not included in the shaping method of Comparative Example 2.

Here, in FIG. 15, the distal end portion 12a of the circumferential wall 12 of the exterior can 2 is bent in a direction toward the central axis 9 to form a curve. The exterior can 2 is thus fixed to the sealing can 3 by crimping. In the upright portion 13 having a greater hardness and thickness than the corner portion 18 as in Working Example 2, deformation is suppressed, which is advantageous in ensuring the sealing properties provided by the gasket 4. This will be described in detail with reference to FIGS. 15, 26A, and 26B after the following description of a manufacturing process with reference to FIGS. 22 to 25.

Figure 22A:
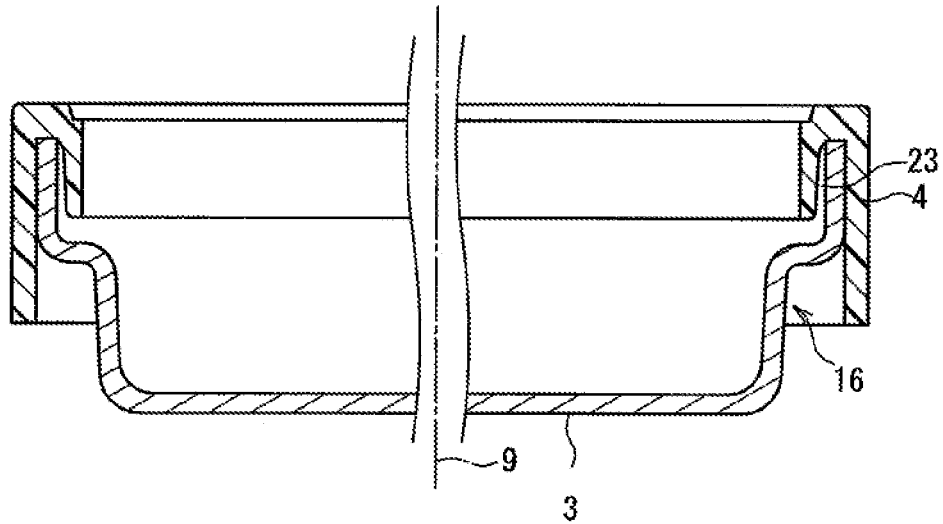
FIGS. 22A and 22B are cross-sectional views of the flat battery according to Embodiment 2 of the present invention in the middle of assembly, where
Figure 22B:
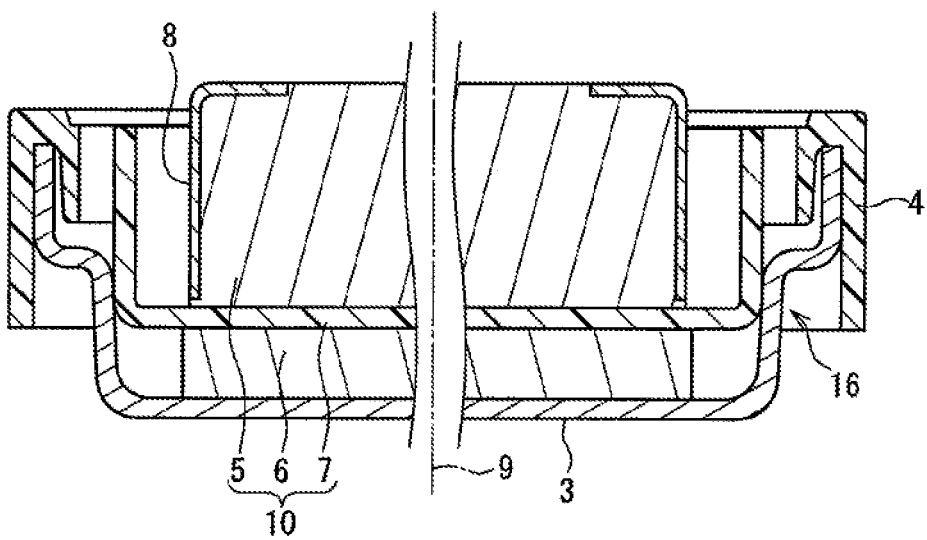

During assembly of the components shown in FIG. 16, assembly is advanced with the components being turned upside down from the orientation shown in FIG. 16. FIGS. 22A and 22B show cross-sectional views of a state in the middle of assembly. FIG. 22A is a cross-sectional view showing a state in which the gasket 4 is installed on the sealing can 3. The circumferential wall 16 of the sealing can 3 is inserted into the gap 23 of the gasket 4, thereby installing the gasket 4 on the sealing can 3.

FIG. 22B shows a state in which the power generating element 10 is housed in the sealing can 3. The negative electrode material 6 is fixed to the sealing can 3 with a conductive adhesive or the like. The separator 7 and the positive electrode material 5 are laid on top of the negative electrode material 6. Then, a nonaqueous electrolyte is injected into the sealing can 3.

Figure 23:
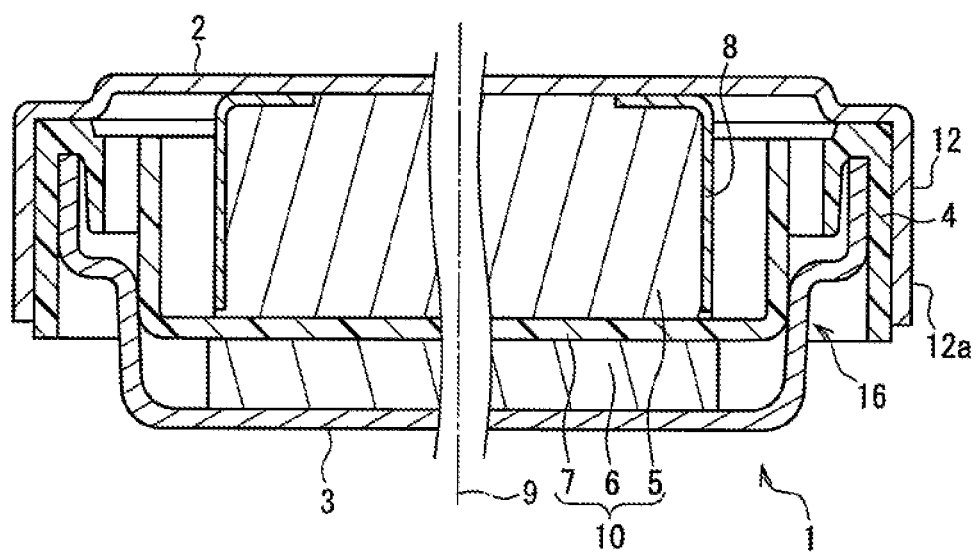
FIG. 23 is a cross-sectional view showing a state in which an exterior can 2 is fitted on an assembly shown in FIG. 22B.

FIG. 23 is a cross-sectional view showing a state in which the exterior can 2 is fitted on an assembly shown in FIG. 22B. In this state, an outer circumferential face of the gasket 4 is fitted against the inner circumferential face of the circumferential wall 12 of the exterior can 2. The components are assembled into the state shown in FIG. 23 before the process proceeds to a crimping step. In the crimping step, the distal end portion 12a of the circumferential wall 12 of the exterior can 2 is bent toward the central axis 9 of the sealing can 3.

Figure 24:
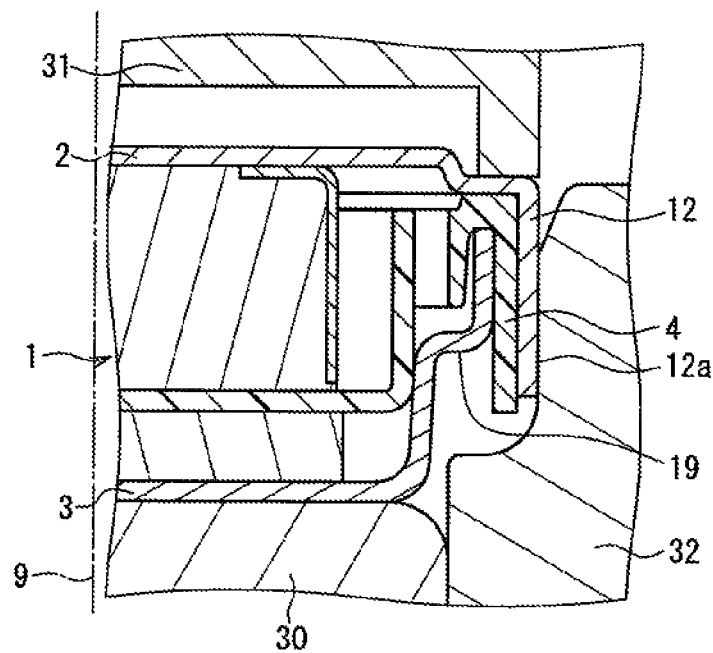
FIG. 24 is a cross-sectional view showing a state before crimping according to Embodiment 2 of the present invention.

FIG. 24 is a cross-sectional view showing a state before crimping. The flat battery 1 shown in FIG. 23 is sandwiched between a knockout pin 30 and a punch 31. A die face of a sealing die 32 fits over an outer circumferential face of the circumferential wall 12 so as to surround the circumferential wall 12 of the exterior can 2. In this state, the knockout pin 30 and the punch 31 are moved down. Thus, the distal end portion 12a of the circumferential wall 12 of the exterior can 2 is bent along a curved face of the sealing die 32 toward the central axis 9 of the sealing can 3.

Figure 25:
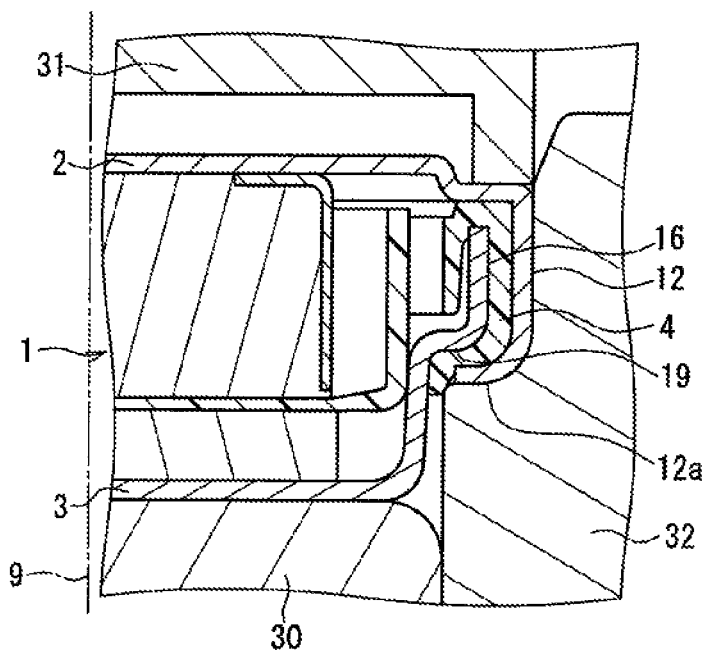
FIG. 25 is a cross-sectional view showing a state after crimping according to Embodiment 2 of the present invention.

FIG. 25 is a cross-sectional view showing a state in which the downward movement of the knockout pin 30 and the punch 31 is completed. In this state, the gasket 4 is sandwiched between the inner circumferential face of the circumferential wall 12 of the exterior can 2 and the outer circumferential face of the circumferential wall 16 of the sealing can 3.

Furthermore, an end portion of the gasket 4 is pressed against the circumferential wall 16 of the sealing can 3 so as to press the circumferential wall 16 toward the central axis 9. This provides good insulation properties and sealing properties between the exterior can 2 and the sealing can 3 having different polarities.

Moreover, between the shoulder portion 19 of the sealing can 3 and the distal end portion 12a of the circumferential wall 12 of the exterior can 2, the gasket 4 is pressed in a height direction of the sealing can 3. This also results in good insulation and sealing properties between the exterior can 2 and the sealing can 3.

In a finished product state after the crimping process shown in FIG. 25, the distal end portion 12a of the circumferential wall 12 of the exterior can 2 is bent toward the central axis 9 of the sealing can 3. During bending, if the circumferential wall 16 of the sealing can 3 is deformed, there is a possibility that the sealing properties provided by the gasket 4 may decrease.

In Comparative Example 2, as shown in FIG. 38, the folded-back portion 107 is formed to increase the strength, thereby preventing the sealing properties from decreasing. In contrast, in Embodiment 2, the upright portion 13 that is a single layer wall with an increased thickness and hardness is formed instead of the folded-back portion 107, thereby preventing the sealing properties from decreasing.

As described above, according to Working Example 2, in FIG. 20A, the thickness of the upright portion 13 is greater than that of the corner portion 18. In other words, the sealing can 3 according to Embodiment 2 satisfies the relationship of an expression (14) below, where the thickness of the corner portion 18 of the sealing can 3 is t1, and the thickness of the upright portion 13 is t2.

$$t1 < t2 \qquad \text{Expression (14)}$$

Furthermore, as described above, according to Working Example 2, in FIG. 20A, the hardness of the upright portion 13 is a higher value than that of the corner portion 18. In other words, the sealing can 3 according to Embodiment 2 satisfies the relationship of an expression (15) below, where the Vickers hardness of the corner portion 18 of the sealing can 3 is Hv1, and the Vickers hardness of the upright portion 13 is Hv2.

$$Hv1 < Hv2 \qquad \text{Expression (15)}$$

With this configuration, the corner portion 18 has an increased hardness due to work hardening as a result of the bending process, and the upright portion 13 has a greater hardness and also a greater thickness than the corner portion 18. Therefore, during the crimping process, deformation of the upright portion 13 is suppressed, and the sealing properties also can be prevented from decreasing.

To make the effect obtained by satisfying the expression (14) more certain, preferably, the relationship of an expression (16) below is satisfied, and more preferably, the relationship of an expression (17) below is satisfied.

$$1.01 \leq t2/t1 \qquad \text{Expression (16)}$$

$$1.05 \leq t2/t1 \qquad \text{Expression (17)}$$

Meanwhile, when the limit of compression achieved by the beating process is taken into account, t2/t1 is preferably within the range of an expression (18) below.

$$t2/t1 \leq 1.30 \qquad \text{Expression (18)}$$

Moreover, to make the effect obtained by satisfying the expression (15) more certain, preferably, the relationship of an expression (19) below is satisfied, and more preferably, the relationship of an expression (20) below is satisfied.

$$1.05 \leq Hv2/Hv1 \qquad \text{Expression (19)}$$

$$1.10 \leq Hv2/Hv1 \qquad \text{Expression (20)}$$

Meanwhile, when the limit of work hardening achieved by the beating process is taken into account, Hv2/Hv1 is preferably within the range of an expression (21) below.

$$Hv2/Hv1 \leq 1.6 \qquad \text{Expression (21)}$$

Preferred numerical ranges of Hv1 and Hv2 are as described below. A stainless steel material such as SUS430 is usually used as the material for the sealing can 3, and the numerical ranges below are derived from the extent of work hardening caused by bending of the corner portion and the extent of work hardening caused by the beating process, in the case of SUS430.

The Vickers hardness Hv1 of the corner portion 18 is preferably within the range of an expression (22) below, more preferably within the range of an expression (23) below, and even more preferably within the range of an expression (24) below.

$$150 \leq Hv1 \qquad \text{Expression (22)}$$

$$170 \leq Hv1 \qquad \text{Expression (23)}$$

$$190 \leq Hv1 \qquad \text{Expression (24)}$$

The Vickers hardness Hv2 of the upright portion 13 is preferably within the range of an expression (25) below, more preferably within the range of an expression (26) below, and even more preferably within the range of an expression (27) below.

$$200 \leq Hv2 \qquad \text{Expression (25)}$$

$$210 \leq Hv2 \qquad \text{Expression (26)}$$

$$220 \leq Hv2 \qquad \text{Expression (27)}$$

Meanwhile, processing for increasing the hardness of the corner portion 18 is difficult, and an excessively high hardness of the corner portion 18 also makes it difficult to increase the hardness of the upright portion 13 to a higher level than the hardness of the corner portion 18. For this reason, the hardness of the corner portion 18 is preferably within the range of an expression (28) below and more preferably within the range of an expression (29) below.

$$Hv1 \leq 210 \qquad \text{Expression (28)}$$

$$Hv1 \leq 200 \qquad \text{Expression (29)}$$

Here, as shown by the solid line 60 in FIG. 21, in Working Example 2, the Vickers hardness of not only the upright portion 13 (points F to H) but the entire circumferential wall 16 (points C to H) is greater than that of the corner portion 18 (point B). With this configuration, the corner portion 18 has an increased hardness due to work hardening as a result of the bending process, and the entire circumferential wall 16 has a higher hardness than the corner portion 18. In this case, deformation of the corner portion 18 and the entire circumferential wall 16 is suppressed during the crimping process, which is more advantageous in preventing the sealing properties from decreasing.

It should be noted that the bottom portion 15 (FIG. 15) that is a planar portion of the sealing can 3 is also required to have a certain level of hardness in order to prevent swelling of the battery and the like, though this is not directly related to the prevention of a decrease in the sealing properties. Thus, the Vickers hardness of the bottom portion 15 is preferably 130 or more and more preferably 140 or more.

Figure 26:
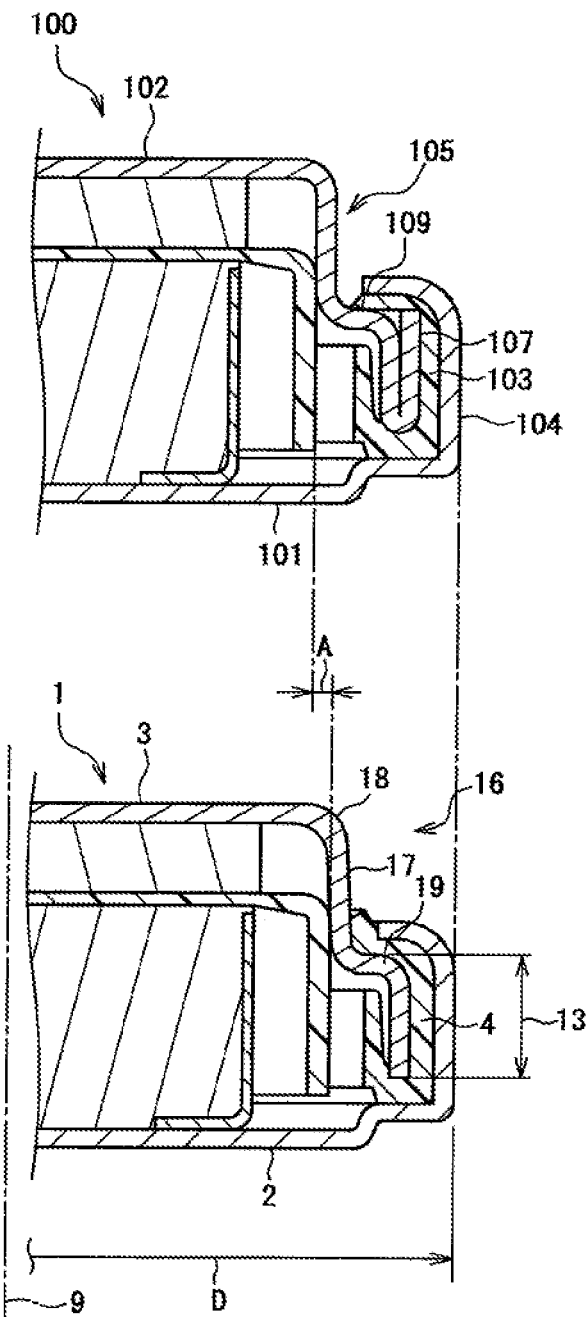
FIGS. 26A and 26B are cross-sectional views for performing a comparison between Embodiment 2 of the present invention and a comparative example, where

Next, Embodiment 2 will be compared with a comparative example with reference to FIGS. 26A and 26B. FIG. 26A is a cross-sectional view of a relevant part of a flat battery 100 according to the comparative example. FIG. 26A shows the same configuration as the conventional example shown in FIG. 38. FIG. 26B is a cross-sectional view of a relevant part of the flat battery 1 according to Embodiment 2. FIG. 26B shows the same configuration as the flat battery 1 shown in FIG. 15.

Both the flat battery 100 and the flat battery 1 have the same external dimension D. A folded-back portion 107 is formed in a sealing can 102 of the flat battery 100, whereas the circumferential wall 16 of the flat battery 1 is a single layer wall without being folded back.

Even when the folded-back portion 107 is omitted from the sealing can 102, the amount of engagement between a shoulder portion 109 of a circumferential wall 105 and a gasket 103 is not changed. In this case, the entire circumferential wall 105 of the sealing can 102 can be shifted toward a circumferential wall 104 of an exterior can 101 by an amount corresponding to the folded-back portion 107 that has been omitted.

The state after shifting corresponds to FIG. 26B. In the flat battery 1 shown in FIG. 26B, the inner circumferential face of the sealing can 3 is shifted outward by a dimension A as compared with the flat battery 100 shown in FIG. 26A. Accordingly, the flat battery 1 can have a larger capacity than the flat battery 100 even though the flat battery 1 has the same external dimension D as the flat battery 100.

Moreover, formation of the rectilinear portion 17 also provides an advantage in ensuring sufficient capacity. In FIG. 26B, an increase in the radius of the corner portion 18 causes the rectilinear portion 17 to become a part of the corner portion 18. With this configuration, the corner portion 18 is displaced toward the central axis 9, which is disadvantageous in ensuring sufficient capacity. In other words, the smaller the radius of the corner portion 18 and the greater the length of the rectilinear portion 17, the larger the capacity can be.

Meanwhile, as described above, in the flat battery 1, an upright portion 13 that satisfies the expressions (14) and (15) is formed, so during the crimping process, deformation of the upright portion 13 is suppressed, and the sealing properties also can be prevented from decreasing.

In other words, it can be said that Embodiment 2 has an advantageous configuration that ensures the sealing properties provided by the gasket 4 while employing a single layer wall without being folded back for the circumferential wall 16 of the sealing can 3, which is an advantageous structure in increasing the capacity.

It should be noted that although the sealing can 3 according to Embodiment 2 is described using an example in which the rectilinear portion 17 is formed in the cross-sectional shape of the circumferential wall 16, the sealing can 3 may have a configuration in which the rectilinear portion 17 is not formed. On the other hand, in the case where the rectilinear portion 17 is formed, the rectilinear portion 17 is present in the cross-sectional shape of the circumferential wall 16 after the crimping process. However, an external force is applied to the circumferential wall 16 by the crimping process, and so, in some cases, the perfectly rectilinear shape of the rectilinear portion 17 cannot be maintained after the crimping process. Even such a configuration is still advantageous in ensuring sufficient capacity.

Therefore, the shape of the rectilinear portion 17 includes not only a perfect straight line but also a curved line that has a large radius of curvature and can be regarded as a straight line. More specifically, it should be construed that the shape of the rectilinear portion 17 includes a curved line having a radius of curvature of 5 mm or more or a curved line having a radius of curvature that is 20 times or more greater than the radius of the corner portion 18.

Moreover, although the dimensions of the flat battery 1 and the materials for the components thereof are described using FIGS. 14 to 16, these dimensions and materials are described by way of example. The flat battery 1 may have dimensions different from those described above, and materials different from those described above may be used.

Embodiment 3

Figure 27:
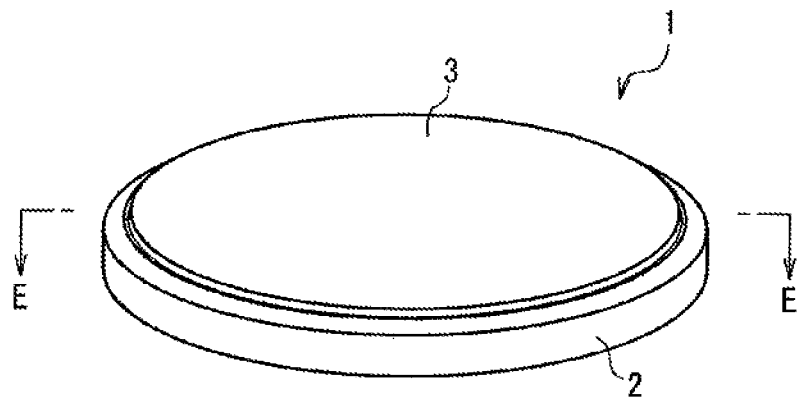
FIG. 27 is a perspective view of a flat battery according to Embodiment 3 of the present invention.

FIG. 27 shows a perspective view of a flat battery according to Embodiment 3 of the present invention. A flat battery 1 is constructed by combining an exterior can 2 serving as a positive electrode can and a sealing can 3 serving as a negative electrode can. An example of the flat battery 1 has an external diameter dimension (dimension D in FIG. 28) of 20.0 mm and a thickness of 5 mm.

Figure 28:
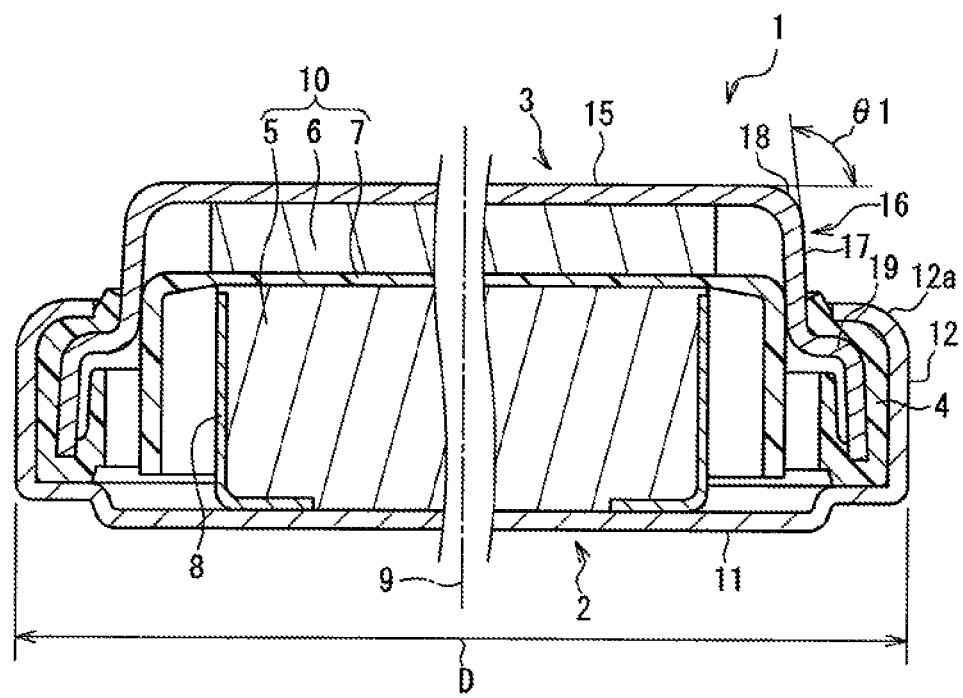
FIG. 28 is a cross-sectional view taken along line EE in FIG. 27.

FIG. 28 is a cross-sectional view taken along line EE in FIG. 27. The exterior can 2 includes a bottom portion 11 and a circumferential wall 12 extending upright from an outer circumference of the bottom portion 11 and has a cylindrical shape that is open at one end. The sealing can 3 includes a planar portion 15 serving as a bottom portion and a circumferential wall 16 extending upright from an outer circumference of the planar portion 15 and has a cylindrical shape that is open at one end. A gasket 4 is interposed between an inner circumferential face of the circumferential wall 12 of the exterior can 2 and an outer circumferential face of the circumferential wall 16 of the sealing can 3.

A distal end portion 12a of the circumferential wall 12 of the exterior can 2 is bent toward a central axis 9 of the sealing can 3 to form a curve, whereby the exterior can 2 is fixed to the sealing can 3 by crimping. Thus, a gap between the exterior can 2 and the sealing can 3 is sealed with the gasket 4, and the exterior can 2 and the sealing can 3 having different polarities are insulated from each other.

The flat battery 1 houses a power generating element 10 and is filled with a nonaqueous electrolyte. The power generating element 10 includes a positive electrode material (electrode material) 5 made of a positive electrode active material and the like pressed into the shape of a disk, a negative electrode material (electrode material) 6 made of metallic lithium or an lithium alloy, which are negative electrode active materials, formed into the shape of a disk, and a non-woven fabric separator 7. The separator 7 is disposed between the positive electrode material 5 and the negative electrode material 6. A positive electrode ring 8 formed of stainless steel or the like is installed on an outer face of the positive electrode material 5.

Figure 29:
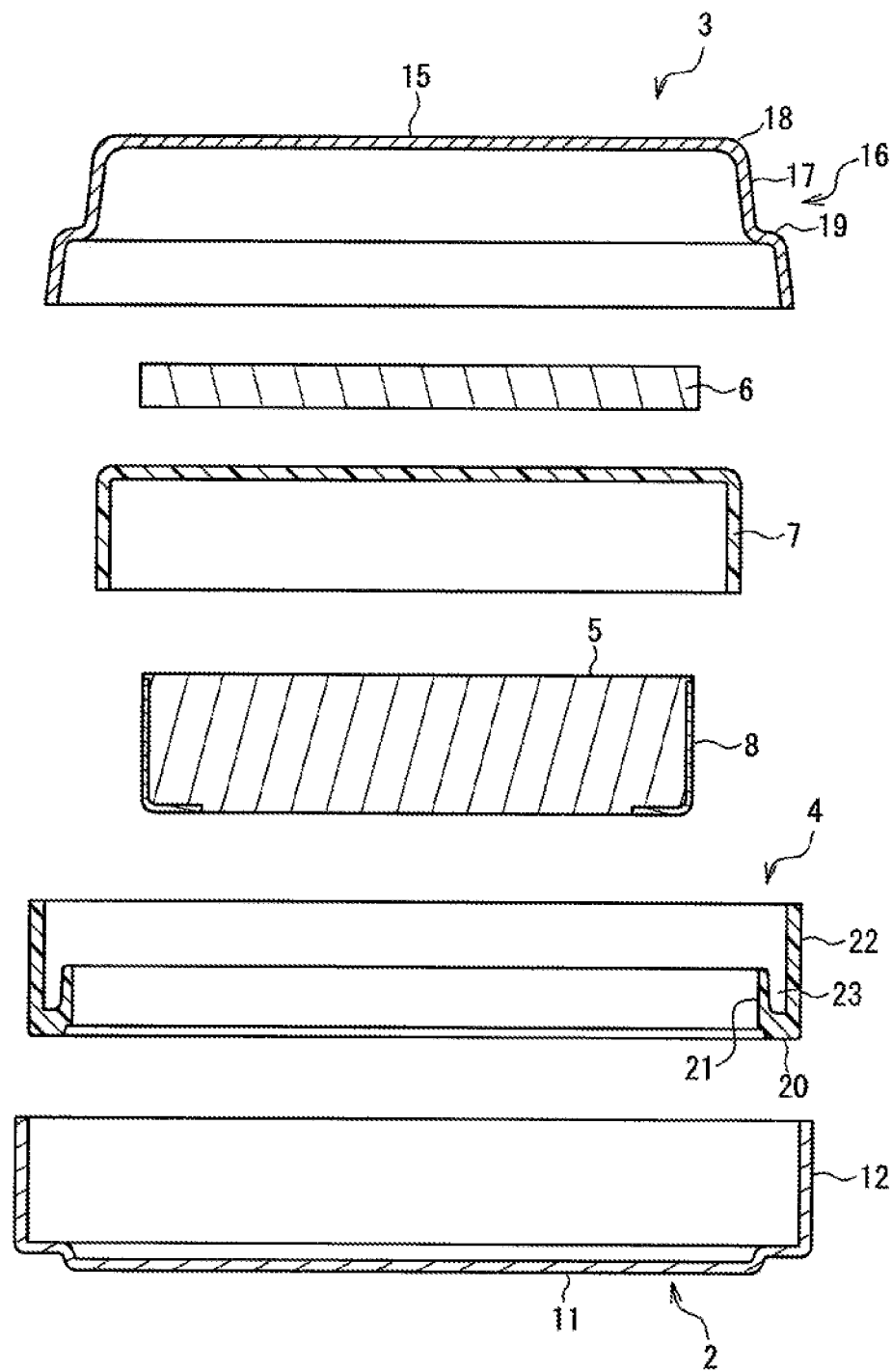
FIG. 29 is an exploded view of the flat battery 1 shown in FIG. 28.

FIG. 29 shows an exploded view of the flat battery 1 shown in FIG. 28. As described above, the exterior can 2 and the sealing can 3 have cylindrical shapes that are open at one end. These cans can be shaped by, for example, press forming a stainless steel material. The circumferential wall portion 16 of the sealing can 3 includes a rectilinear portion 17, and a corner portion 18 is formed at the intersection of the planar portion 15 and the rectilinear portion 17. Furthermore, the circumferential wall portion 16 is stepped at a shoulder portion 19.

The gasket 4 is a resin molded article and is made by molding a resin composition containing, for example, polyphenylene sulfide (PPS) as a main ingredient and an olefin elastomer. The gasket 4 is a ring-like member and includes a base portion 20 and inner and outer walls 21 and 22 extending upwardly from the base portion 20. A gap 23 is formed between the inner wall 21 and the outer wall 22. The circumferential wall 16 of the sealing can 3 can be inserted into this gap 23.

The positive electrode material 5 is made by shaping the positive electrode active material integrally with the positive electrode ring 8 into the shape of a disk. Examples of the positive electrode active material include those obtained by shaping a positive electrode mixture prepared by mixing, for example, graphite, a tetrafluoroethylene-hexafluoropropylene copolymer, and hydroxypropylcellulose into manganese dioxide.

The separator 7 is formed of a non-woven fabric, and the material for the non-woven fabric is, for example, a fiber made of polybutylene terephthalate.

The separator 7 is impregnated with a nonaqueous electrolyte. For example, a solution of LiClO$_4$ dissolved in a solvent prepared by mixing propylene carbonite with 1,2-dimethoxyethane can be used as the nonaqueous electrolyte. The separator 7 has a thickness of, for example, about 0.3 to 0.4 mm.

Figure 30:
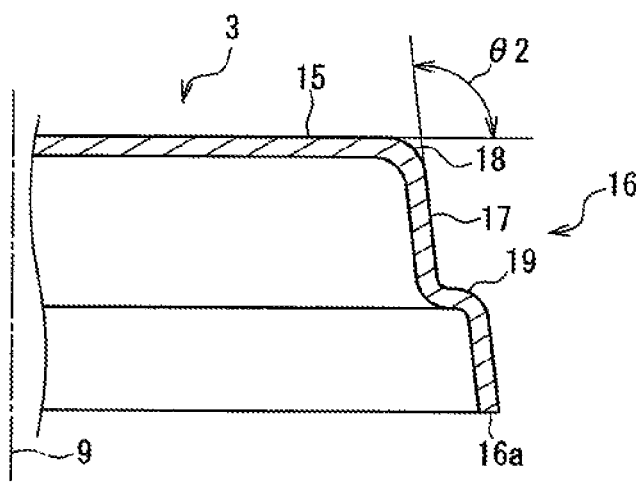
FIG. 30 is an enlarged view of and around a circumferential wall 16 of a sealing can 3 shown in FIG. 29.

FIG. 30 shows an enlarged view of and around the circumferential wall 16 of the sealing can 3 shown in FIG. 29. An angle θ2 is an angle formed by the planar portion 15 and the rectilinear portion 17 when the sealing can 3 is in a separated state. The angle θ2 is greater than 90°. Thus, the farther from the corner portion 18 and closer to a distal end 16a of the circumferential wall portion 16, the larger the inner diameter of the sealing can 3.

Figure 31A:
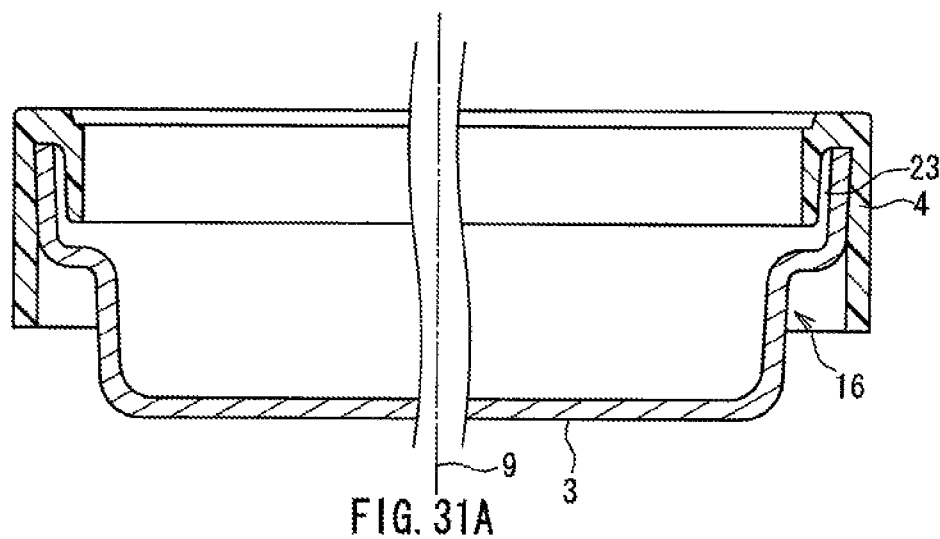
FIGS. 31A and 31B are cross-sectional views of the flat battery according to Embodiment 3 of the present invention in the middle of assembly, where
Figure 31B:
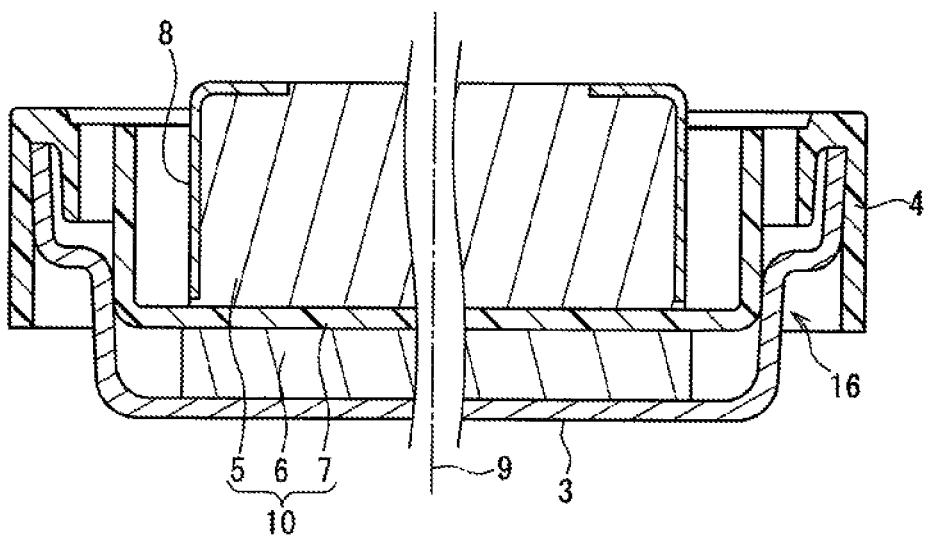

During assembly of the components shown in FIG. 29, assembly is advanced with the components being turned upside down from the orientation shown in FIG. 29. FIGS. 31A and 31B show cross-sectional views of a state in the middle of assembly. FIG. 31A is a cross-sectional view showing a state in which the gasket 4 is installed on the sealing can 3. The circumferential wall 16 of the sealing can 3 is inserted into the gap 23 of the gasket 4, thereby installing the gasket 4 on the sealing can 4.

FIG. 31B shows a state in which the power generating element 10 is housed in the sealing can 3. The negative electrode material 6 is fixed to the sealing can 3 with a conductive adhesive or the like. The separator 7 and the positive electrode material 5 are laid on top of the negative electrode material 6. Then, the nonaqueous electrolyte is injected into the sealing can 3.

Figure 32:
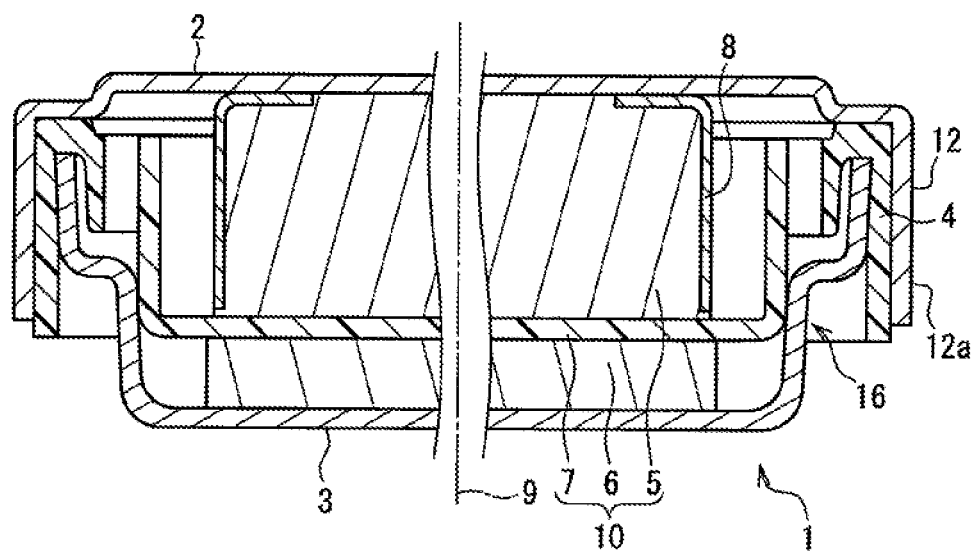
FIG. 32 is a cross-sectional view showing a state in which an exterior can 2 is fitted on an assembly shown in FIG. 31B.

FIG. 32 is a cross-sectional view showing a state in which the exterior can 2 is fitted on an assembly shown in FIG. 31B. In this state, an outer circumferential face of the gasket 4 is fitted against the inner circumferential face of the circumferential wall 12 of the exterior can 2. The components are assembled into the state shown in FIG. 32 before the process proceeds to a crimping step. In the crimping step, the distal end portion 12a of the circumferential wall 12 of the exterior can 2 is bent toward the central axis 9 of the sealing can 3.

Figure 33:
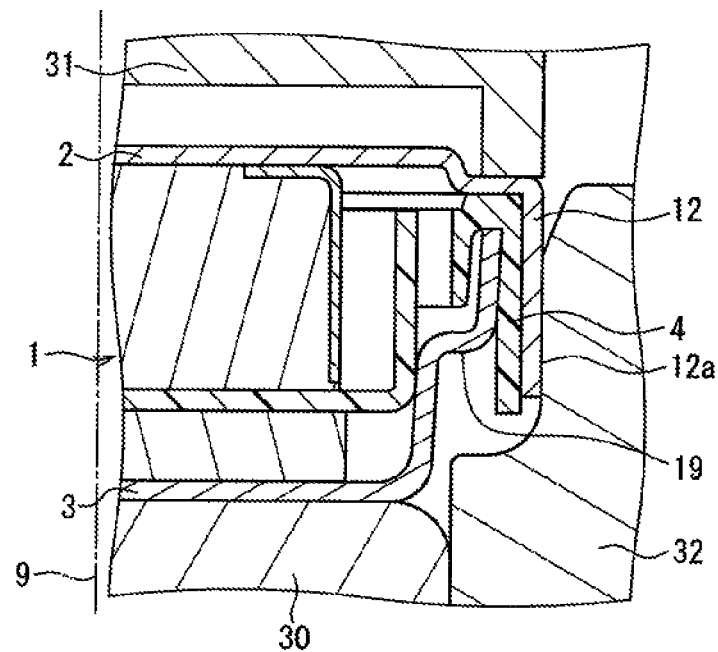
FIG. 33 is a cross-sectional view showing a state before crimping according to Embodiment 3 of the present invention.

FIG. 33 is a cross-sectional view showing a state before crimping. The flat battery 1 shown in FIG. 32 is sandwiched between a knockout pin 30 and a punch 31. A die face of a sealing die 32 fits over an outer circumferential face of the circumferential wall 12 so as to surround the circumferential wall 12 of the exterior can 2. In this state, the knockout pin 30 and the punch 31 are moved down. Thus, the circumferential wall 12 of the exterior can 2 is bent along a curved face of the sealing die 32 toward the central axis 9 of the sealing can 3.

Figure 34:
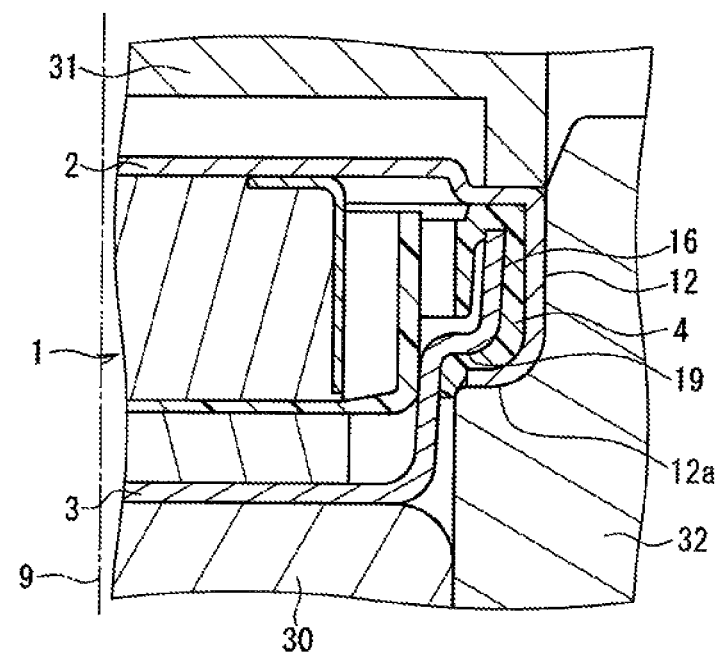
FIG. 34 is a cross-sectional view showing a state after crimping according to Embodiment 3 of the present invention.

FIG. 34 is a cross-sectional view showing a state in which the downward movement of the knockout pin 30 and the punch 31 is completed. In this state, the gasket 4 is sandwiched between the inner circumferential face of the circumferential wall 12 of the exterior can 2 and the outer circumferential face of the circumferential wall 16 of the sealing can 3.

Furthermore, an end portion of the gasket 4 is pressed against the circumferential wall 16 of the sealing can 3 so as to press the circumferential wall 16 toward the central axis 9. This provides good insulation properties and sealing properties between the exterior can 2 and the sealing can 3 having different polarities.

Moreover, between the shoulder portion 19 of the sealing can 3 and the distal end portion 12a of the circumferential wall 12 of the exterior can 2, the gasket 4 is pressed in a height direction of the sealing can 3. This also provides good insulation and sealing properties between the exterior can 2 and the sealing can 3.

The flat battery 1 is removed from the state shown in FIG. 34. FIG. 28 shows the flat battery 1 after being removed from the state shown in FIG. 34 and turned upside down. In this state, the circumferential wall 16 of the sealing can 3 has also been deformed due to the crimping process of the circumferential wall 12 of the exterior can 2.

As shown in FIG. 30, when the sealing can 3 is in a separated state before assembly, an angle formed by the planar portion 15 and the rectilinear portion 17 is θ2, and the angle θ2 is greater than 90°. In the state after the crimping process shown in FIG. 28, the angle θ2 has become an angle θ1 smaller than the angle θ2. This will be described with reference to FIG. 35.

Figure 35:
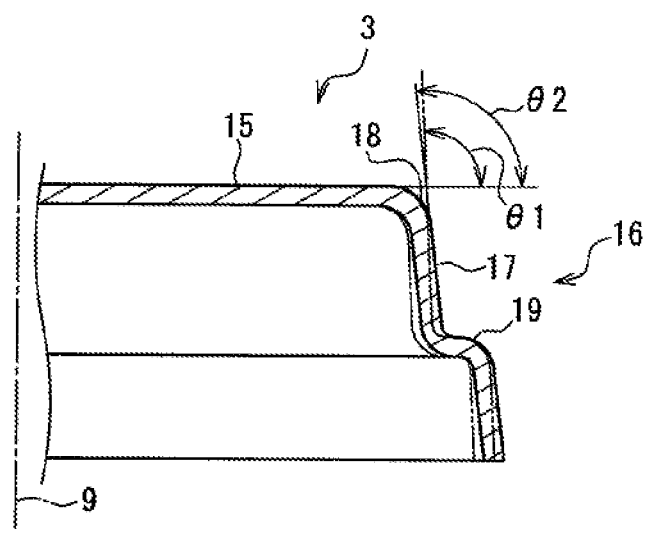
FIG. 35 is a diagram for illustrating the change in an angle formed by a planar portion and a rectilinear portion between when the sealing can according to Embodiment 3 of the present invention is in a separated state and when the sealing can is in an assembled state.

FIG. 35 is a cross-sectional view for illustrating a change in the angle formed by the planar portion 15 and the rectilinear portion 17 between when the sealing can 3 is in a separated state and when the sealing can 3 is in an assembled state. The angle θ2 in FIG. 35 is the same as the angle θ2 in FIG. 30 and indicates the angle formed by the planar portion 15 and the rectilinear portion 17 when the sealing can is in a separated state before assembly.

A long dashed double-short dashed line in FIG. 35 indicates the circumferential wall 16 after fixation by crimping, and the circumferential wall 16 has been deformed toward the central axis 9. Thus, the angle formed by the planar portion 15 and the rectilinear portion 17 has changed from the angle θ2 to an angle θ1 that is smaller than the angle θ2.

The angle θ1 after fixation by crimping remains greater than 90°. Therefore, in FIG. 28, the adhesion in an area of contact between the circumferential wall 16 of the sealing can 3 and the gasket 4 is maintained, and the sealing properties provided by the gasket 4 are maintained.

Moreover, after the crimping process, a spring-back effect caused by the recovery of the circumferential wall 16 of the sealing can 3 to its original state can be obtained. Thus, the circumferential wall 16 presses the gasket 4. This is also useful in ensuring the sealing properties provided by the gasket 4.

Meanwhile, to maintain the state in which the circumferential wall 16 presses the gasket 4, sufficient strength is required in the vicinity of the corner portion 18 where the stress is concentrated. Due to the bending process by which the angle θ2 is changed to the angle θ1, work hardening is obtained in the vicinity of the corner portion 18. Thus, the strength in the vicinity of the corner portion 18 can be increased.

Next, numerical ranges of the angles θ1 and θ2 will be described. The angle θ1 after fixation by crimping is a value greater than 90° and satisfies an expression (30) below. In order to reliably ensure that the angle θ1 is greater than 90°, preferably, an expression (31) is satisfied.

$$90° < θ1 \qquad \text{Expression (30)}$$

$$90.5° ≤ θ1 \qquad \text{Expression (31)}$$

Moreover, when the ensuring of a sufficient inner volume is taken into account, the angle θ1 is preferably within the range of an expression (32) below and more preferably within the range of an expression (33).

$$90° < θ1 ≤ 95° \qquad \text{Expression (32)}$$

$$90.5° ≤ θ1 ≤ 93° \qquad \text{Expression (33)}$$

In the expression (32), the upper limit value is set to 95° because the greater the angle θ1, the larger the amount of wasted space in the inner volume. Specifically, referring to FIG. 28, it is necessary to maintain the external dimension D of the flat battery 1. If the angle θ1 is increased with the external dimension D being fixed, the corner portion 18 is displaced toward the central axis 9, resulting in a decrease in the inner volume.

Moreover, an angle difference θ3 (θ2−θ1) between the angle θ2 at the time when the sealing can 3 is in a separated state and the angle θ1 after fixation by crimping is preferably within the range of an expression (34) below and more preferably within the range of an expression (35).

$$0.5°≤θ3≤5° \quad \text{Expression (34)}$$

$$1°≤θ3≤3° \quad \text{Expression (35)}$$

An excessively large angle difference θ3 causes difficulty in the insertion of the gasket 4 shown in FIG. 31A or the fitting of the exterior can 2 shown in FIG. 32. An angle difference θ3 within the range of the expression (34) or (35) facilitates manufacturing and, at the same time, makes it possible to obtain an effect that the sealing properties are improved by spring-back and an effect that the strength is increased by work hardening in the vicinity of the corner portion 18.

It should be noted that although the spring-back effect or the extent of work hardening decreases in the vicinity of the lower limit value of the expression (34) or (35), the sealing properties provided by the gasket 4 are still maintained as long as the angle θ1 after fixation by crimping is maintained so as to be greater than 90°.

Next, in order for the angle θ1 to be greater than 90° as described above, preferably, the angle θ2 at the time when the sealing can 3 is in a separated state satisfies an expression (36) below.

$$92°≤θ2 \quad \text{Expression (36)}$$

On the other hand, when consideration is given to the expressions (32) and (33) for ensuring a sufficient inner volume and the expressions (34) and (35) for balancing the ease of manufacture and the effect of work hardening or spring-back, the angle θ2 is preferably within the range of an expression (37) below and more preferably within the range of an expression (38).

$$92°≤θ2≤98° \quad \text{Expression (37)}$$

$$93°≤θ2≤95° \quad \text{Expression (38)}$$

In a working example in which the angles θ1, θ2, and θ3 are within the above-described numerical ranges, the angle θ1 of the sealing can 3 after fixation by crimping is 90.9°, the angle θ2 at the time when the sealing can 3 is in a separated state is 93.8°, and the angle difference θ3 is 2.9°.

Figure 36A:
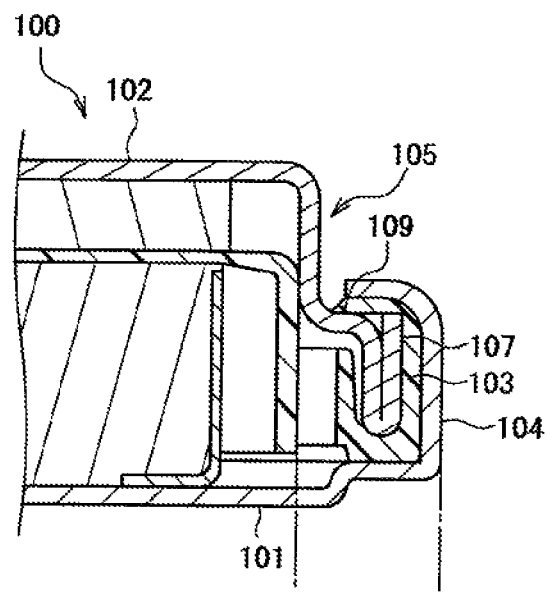
FIGS. 36A and 36B are cross-sectional views for performing a comparison between Embodiment 3 of the present invention and a comparative example, where
Figure 36B:
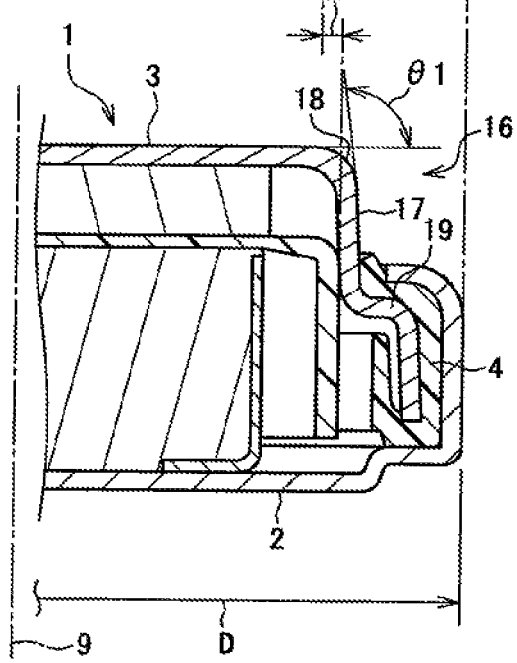
Figure 37:
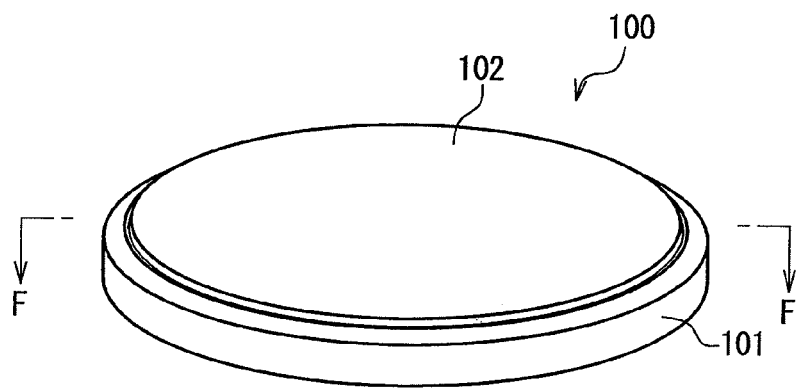
FIG. 37 is a perspective view of an example of a conventional flat battery.

Next, Embodiment 3 will be compared with a comparative example with reference to FIGS. 36A and 36B. FIG. 36A is a cross-sectional view of a relevant part of a flat battery 100 according to a comparative example. FIG. 36A shows the same configuration as the conventional example shown in FIG. 38. FIG. 36B is a cross-sectional view of a relevant part of the flat battery 1 according to Embodiment 3. FIG. 36B shows the same configuration as the flat battery 1 shown in FIG. 28.

Both the flat battery 100 and the flat battery 1 have the same external dimension D. A folded-back portion 107 is formed in a sealing can 102 of the flat battery 100, whereas the circumferential wall 16 of the flat battery 1 is a single layer wall without being folded back.

Even when the folded-back portion 107 is omitted from the sealing can 102, the amount of engagement between a shoulder portion 109 of a circumferential wall 105 and a gasket 103 is not changed. In this case, the entire circumferential wall 105 of the sealing can 102 can be shifted toward a circumferential wall 104 of an exterior can 101 by an amount corresponding to the folded-back portion 107 that has been omitted.

The state after shifting corresponds to FIG. 36B. In the flat battery 1 shown in FIG. 36B, the inner circumferential face of the sealing can 3 is shifted outward by a dimension A as compared with the flat battery 100 shown in FIG. 36A. Accordingly, the flat battery 1 can have a larger capacity than the flat battery 100 even though the flat battery 1 has the same external dimension D as the flat battery 100.

Moreover, formation of the rectilinear portion 17 also provides an advantage in ensuring sufficient capacity. In FIG. 36B, an increase in the radius of the corner portion 18 causes the rectilinear portion 17 to become a part of the corner portion 18. With this configuration, the corner portion 18 is displaced toward the central axis 9, which is disadvantageous in ensuring sufficient capacity. In other words, the smaller the radius of the corner portion 18 and the greater the length of the rectilinear portion 17, the larger the capacity can be.

Meanwhile, as described above, since the angle θ1 of the flat battery 1 is greater than 90°, the sealing properties provided by the gasket 4 can be ensured. Moreover, due to the spring-back effect, the sealing properties can be improved even more, and a lack of strength also can be compensated for by work hardening.

In other words, it can be said that Embodiment 3 has an advantageous configuration that ensures the sealing properties provided by the gasket 4 while employing a single layer wall without being folded back for the circumferential wall 16 of the sealing can 3, which is an advantageous structure in increasing the capacity.

It should be noted that in the sealing can 3 according to Embodiment 3, the rectilinear portion 17 is formed in the cross-sectional shape of the circumferential wall 16 both before and after the crimping process. Meanwhile, an external force is applied to the circumferential wall 16 by the crimping process. Thus, in some cases, the perfectly rectilinear shape of the rectilinear portion 17 cannot be maintained after the crimping process. Even with such a configuration, the effect of increasing the sealing properties provided by the gasket 4 still can be obtained.

Therefore, the shape of the rectilinear portion 17 includes not only a perfect straight line but also a curved line that has a large radius of curvature and can be regarded as a straight line. More specifically, it should be construed that the shape of the rectilinear portion 17 includes a curved line having a radius of curvature of 5 mm or more or a curved line having a radius of curvature that is 20 times or more greater than the radius of the corner portion 18.

Moreover, although the dimensions of the flat battery 1 and the materials for the components thereof are described using FIGS. 27 to 29, these dimensions and materials are described by way of example. The flat battery 1 may have dimensions different from those described above, and materials different from those described above may be used.

The embodiments described above are solely intended to illustrate the technological content of the present invention, and the present invention is not limited to or by these specific examples alone. Various modifications are possible within the spirit of the invention and the scope of the claims, and the present invention should be interpreted broadly.

The invention claimed is:

1. A method for manufacturing a flat battery comprising an exterior can and a sealing can that seals an opening of the exterior can, comprising:
   (a) a step of forming the exterior can that comprises a bottom portion and a first circumferential wall extending upright from an outer circumference of the bottom portion and that has a cylindrical shape open at one end;
   (b) a step of forming a sealing can that comprises a planar portion and a second circumferential wall extending upright from an outer circumference of the planar portion and that has a cylindrical shape open at one end, the second circumferential wall having a rectilinear portion connected to the planar portion via a corner portion, the rectilinear portion being constituted by a perfectly straight line or a curved line having a radius of curvature that is 20 or more times as great as a radius of the corner portion, wherein the second circumferential wall is a single layer wall without being folded back, and an angle θ2 formed by the planar portion and the rectilinear portion is greater than 90°; and
   (c) a step of bending a distal end portion of the first circumferential wall of the exterior can that is formed in the step (a) toward a central axis of the sealing can that is formed in the step (b) to form a curve, and thus the exterior can is fixed to the sealing can by crimping, wherein the second circumferential wall of the sealing can is deformed so that an angle θ1 formed by the planar portion and the rectilinear portion is smaller than the angle θ2 and 95° or less.

2. The method for manufacturing a flat battery according to claim 1, wherein a difference θ2−θ1 between the angle θ2 and the angle θ1 is between 0.5° and 5° inclusive.

3. The method for manufacturing a flat battery according to claim 1, wherein the angle θ2 is between 92° and 98° inclusive.

4. The method for manufacturing a flat battery according to claim 1, wherein the angle θ1 is greater than 90°.

5. A method for manufacturing a flat battery comprising an exterior can and a sealing can that seals an opening of the exterior can, comprising:
   (a) a step of forming the exterior can that comprises a bottom portion and a first circumferential wall extending upright from an outer circumference of the bottom portion and that has a cylindrical shape open at one end;
   (b) a step of forming a sealing can that comprises a planar portion and a second circumferential wall extending upright from an outer circumference of the planar portion and that has a cylindrical shape open at one end, the second circumferential wall having a rectilinear portion connected to the planar portion via a corner portion, the rectilinear portion being constituted by a perfectly straight line or a curved line having a radius of curvature that is 20 or more times as great as a radius of the corner portion, wherein the second circumferential wall is a single layer wall without being folded back, and an angle θ2 formed by the planar portion and the rectilinear portion is greater than 90° and 98° or less; and
   a step of bending a distal end portion of the first circumferential wall of the exterior can that is formed in the step (a) toward a central axis of the sealing can that is formed in the step (b) to form a curve, and thus the exterior can is fixed to the sealing can by crimping, wherein the second circumferential wall of the sealing can is deformed so that an angle θ1 formed by the planar portion and the rectilinear portion is smaller than the angle θ2.

6. The method for manufacturing a flat battery according to claim 5, wherein a difference θ2−θ1 between the angle θ2 and the angle θ1 is between 0.5° and 5° inclusive.

7. The method for manufacturing a flat battery according to claim 5, wherein the angle θ2 is 92° or more.

8. The method for manufacturing a flat battery according to claim 5, wherein the angle θ1 is greater than 90°.

9. The method for manufacturing a flat battery according to claim 5, wherein the angle θ1 is 95° or less.

* * * * *